US012651803B2

(12) United States Patent
Li et al.

(10) Patent No.: US 12,651,803 B2
(45) Date of Patent: Jun. 9, 2026

(54) POLYMER, SEPARATOR, AND RELATED SECONDARY BATTERY AND ELECTRIC APPARATUS

(71) Applicant: CONTEMPORARY AMPEREX TECHNOLOGY (HONG KONG) LIMITED, Hong Kong (CN)

(72) Inventors: Lei Li, Ningde (CN); Meihuang Chen, Ningde (CN); Yi Zheng, Ningde (CN); Manxiang Wei, Ningde (CN); Ming Xu, Ningde (CN); Chengdong Sun, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/039,274

(22) Filed: Jan. 28, 2025

(65) Prior Publication Data

US 2025/0174828 A1 May 29, 2025

Related U.S. Application Data

(63) Continuation of application No. PCT/CN2022/136425, filed on Dec. 5, 2022.

(51) Int. Cl.
*H01M 50/42* (2021.01)
*C08F 220/18* (2006.01)
(Continued)

(52) U.S. Cl.
CPC ........... *H01M 50/42* (2021.01); *C08F 220/18* (2013.01); *C08F 220/44* (2013.01); *C08F 220/50* (2013.01); *C08F 230/08* (2013.01); *C08G 77/442* (2013.01); *H01M 50/403* (2021.01); *H01M 50/409* (2021.01); *H01M 50/449* (2021.01); *H01M 50/494* (2021.01)

(58) Field of Classification Search
CPC C08F 230/08; C08F 220/18; C08F 220/1802; C08F 220/1803; C08F 220/1804; C08F 220/1805; C08F 220/20; H01M 50/42; H01M 50/489; H01M 50/494
See application file for complete search history.

(56) References Cited

U.S. PATENT DOCUMENTS

2007/0122716 A1 5/2007 Seo
2011/0027642 A1 2/2011 Lee
(Continued)

FOREIGN PATENT DOCUMENTS

CN 104868086 A 8/2015
CN 104900832 A 9/2015
(Continued)

OTHER PUBLICATIONS

Machine translation of CN 116606615 (no date).*
Machine translation of KR 2016/0108035 (no date).*
International Search Report dated Jul. 20, 2023 for application PCT/CN2022/136425.
International Search Report and Written Opinion in International application No. PCT/CN2022/136435, mailed on Aug. 16, 2023.
Request for the Submission of an Opinion in Korean Application No. 10-2025-7003912, issued on Oct. 22, 2025.
Non-Final Office Action in U.S. Appl. No. 19/036,501, issued on Aug. 25, 2025.
"What Are Silicones?," Global Silicones Council (Aug. 19, 2025).
(Continued)

*Primary Examiner* — Marc S Zimmer
(74) *Attorney, Agent, or Firm* — LADAS & PARRY LLP

(57) ABSTRACT

A polymer, a separator, and a related secondary battery and electric apparatus are described. The polymer includes a first structural unit, a second structural unit, and a third structural unit; where the first structural unit includes a structural unit represented by formula (I), and in formula (I), $R_1$ includes one or more of hydrogen atom and substituted or unsubstituted C1-C5 alkyl, and $R_2$ includes one or more of substituted or unsubstituted C1-C20 alkyl, substituted or unsubstituted C3-C20 cycloalkyl, and substituted or unsubstituted C1-C20 hydroxyalkyl; the second structural unit includes a structural unit represented by formula (II), and in formula (II), $R_3$ includes one or more of hydrogen atom and substituted or unsubstituted C1-C5 alkyl; and the third structural unit includes a structural unit represented by formula (III). The units in the polymer can synergistically improve the adhesion, stability, swelling resistance, and thermal stability of the polymer.

formula (I)

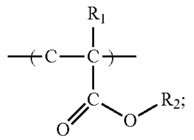

formula (II)

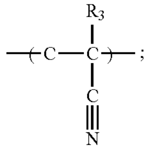

and formula (III)

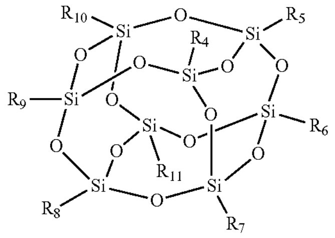

16 Claims, 2 Drawing Sheets

(51) Int. Cl.

| | |
|---|---|
| ***C08F 220/44*** | (2006.01) |
| ***C08F 220/50*** | (2006.01) |
| ***C08F 230/08*** | (2006.01) |
| ***C08G 77/442*** | (2006.01) |
| ***H01M 50/403*** | (2021.01) |
| ***H01M 50/409*** | (2021.01) |
| ***H01M 50/449*** | (2021.01) |
| ***H01M 50/494*** | (2021.01) |

(56) References Cited

U.S. PATENT DOCUMENTS

| | | | | |
|---|---|---|---|---|
| 2012/0135289 | A1 | 5/2012 | Noda | |
| 2013/0059192 | A1 | 3/2013 | Kajita et al. | |
| 2013/0330590 | A1 | 12/2013 | Toyoda | |
| 2014/0158932 | A1 | 6/2014 | Sun | |
| 2014/0377630 | A1 | 12/2014 | Kawakami et al. | |
| 2016/0149190 | A1 * | 5/2016 | Fukuchi | H01M 50/426 429/144 |
| 2017/0317352 | A1 | 11/2017 | Lee et al. | |
| 2018/0053963 | A1 | 2/2018 | Tanaka | |
| 2019/0326579 | A1 | 10/2019 | Ryu | |
| 2020/0203694 | A1 | 6/2020 | Yun | |
| 2021/0057703 | A1 | 2/2021 | Hamada et al. | |
| 2022/0306898 | A1 * | 9/2022 | Bindumadhavan | H01M 4/621 |
| 2022/0311097 | A1 | 9/2022 | Yen | |
| 2023/0344081 | A1 * | 10/2023 | Yin | H01M 50/443 |

FOREIGN PATENT DOCUMENTS

| | | | | | |
|---|---|---|---|---|---|
| CN | 107384261 | A | | 11/2017 | |
| CN | 108336279 | A | | 7/2018 | |
| CN | 108493387 | A | | 9/2018 | |
| CN | 109950451 | A | | 6/2019 | |
| CN | 110391382 | A | | 10/2019 | |
| CN | 111704702 | A | | 9/2020 | |
| CN | 111718446 | A | | 9/2020 | |
| CN | 114316152 | A | | 4/2022 | |
| CN | 114361717 | A | | 4/2022 | |
| CN | 116606615 | A | * | 8/2023 | C09J 133/064 |
| EP | 3407413 | B1 | | 4/2022 | |
| JP | 2003007279 | A | | 1/2003 | |
| JP | 2010077183 | A | | 4/2010 | |
| JP | 2011006585 | A | | 1/2011 | |
| JP | 2014149936 | A | | 8/2014 | |
| JP | 201473016 | A | | 9/2014 | |
| JP | 2015106511 | A | | 6/2015 | |
| JP | 2015220223 | A | | 12/2015 | |
| JP | 2016031868 | A | | 3/2016 | |
| JP | 2016105398 | A | | 6/2016 | |
| JP | 2018056142 | A | | 4/2018 | |
| JP | 2019067502 | A | | 4/2019 | |
| KR | 20070055979 | A | | 5/2007 | |
| KR | 20150056122 | A | | 5/2015 | |
| KR | 20160108035 | A | * | 9/2016 | C08K 3/013 |
| KR | 20210042404 | A | | 4/2021 | |
| WO | 2012115252 | A1 | | 8/2012 | |
| WO | 2013014742 | A1 | | 1/2013 | |
| WO | WO-2014084527 | A1 | * | 6/2014 | |
| WO | 2021/257759 | A1 | | 12/2021 | |
| WO | 2022019572 | A1 | | 1/2022 | |
| WO | WO-2024174093 | A1 | * | 8/2024 | H01M 50/409 |

OTHER PUBLICATIONS

Notice of Reasons for Reufsal dated Jan. 19, 2026 for application JP 2025-502693.

Notice of Reasons for Refusal dated Jan. 5, 2026 for application JP 2025-502909.

Final Office Action dated Jan. 13, 2026 for U.S. Appl. No. 19/036,501.

Hony Engineering Plastic Limited; "Dielectric Constant of Commonly Used Polymer Plasic"; Published Jun. 6, 2024; accessed via web on Jan. 7, 2026 at <https://imww.honyplastic.com/news/dielectric-constant-of-commonly-used-polymer-plastics-258498.html>: (Year: 2024).

ChemEurope.com Enyclopedia; "Hildebrand solubility parameter"; accessed via web Jan. 6, 2026 at <https://www.chemeurope.com/encyclopedia/Hildebrand_solubility_parameter.html>. (Year: 2026).

Extended European Search Report in the European application No. 22967457.7, mailed on Feb. 6, 2026.

* cited by examiner

POLYMER, SEPARATOR, AND RELATED SECONDARY BATTERY AND ELECTRIC APPARATUS

CROSS-REFERENCE TO RELATED APPLICATIONS

This application is a continuation of International application PCT/CN2022/136425 filed on Dec. 5, 2022, the subject matter of which is incorporated herein in its entirety.

TECHNICAL FIELD

This application relates to the battery field, and specifically to a polymer, a separator, and a related secondary battery and electric apparatus.

BACKGROUND

Secondary batteries have characteristics such as high capacity and long service life, and thus are widely used in electronic devices such as mobile phones, laptop computers, electric bicycles, electric vehicles, electric aircrafts, electric ships, electric toy cars, electric toy ships, electric toy aircrafts, and electric tools.

With the increasingly wide application of batteries, requirements for the safety performance of secondary batteries have become increasingly stringent. How to continuously improve the safety performance of secondary batteries is still an urgent issue to be solved by those skilled in the art.

SUMMARY

This application is conducted in view of the above issue, and is intended to provide a polymer, a separator, and a related secondary battery and electric apparatus.

A first aspect of this application provides a polymer. The polymer includes a first structural unit, a second structural unit, and a third structural unit; where the first structural unit includes a structural unit represented by formula (I):

formula (I)

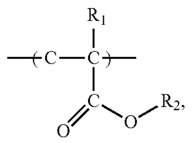

where in formula (I), $R_1$ includes one or more of hydrogen atom and substituted or unsubstituted C1-C5 alkyl; and optionally, $R_1$ includes one or more of hydrogen atom and substituted or unsubstituted C1-C3 alkyl; and $R_2$ includes one or more of substituted or unsubstituted C1-C20 alkyl, substituted or unsubstituted C3-C20 cycloalkyl, and substituted or unsubstituted C1-C20 hydroxyalkyl; and optionally, $R_2$ includes one or more of C1-C12 alkyl, C3-C12 cycloalkyl, and C1-C12 hydroxyalkyl;

the second structural unit includes a structural unit represented by formula (II):

formula (II)

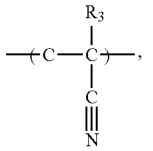

where in formula (II), $R_3$ includes one or more of hydrogen atom and substituted or unsubstituted C1-C5 alkyl; and optionally, $R_3$ includes one or more of hydrogen atom and substituted or unsubstituted C1-C3 alkyl; and the third structural unit includes a structural unit represented by formula (III):

formula (III)

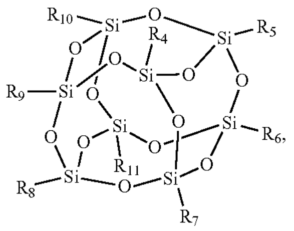

where in formula (III), $R_4$ to $R_{11}$ each independently include one or more of substituted or unsubstituted C1-C10 alkyl, for example, one or more of a structural unit represented by formula (III-1), and at least one of $R_4$ to $R_{11}$ includes the structural unit represented by formula (III-1):

formula (III-1)

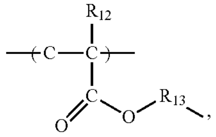

where in formula (III-1), $R_{12}$ includes one or more of hydrogen atom and substituted or unsubstituted C1-C5 alkyl; and optionally, $R_{12}$ includes one or more of hydrogen atom and substituted or unsubstituted C1-C3 alkyl; and $R_{13}$ includes substituted or unsubstituted C1-C10 alkyl; and optionally, $R_{13}$ includes substituted or unsubstituted C3-C10 alkyl.

Therefore, in this application, the flexible monomer chain segment in the molecular chain segment of the first structural unit can adjust the glass transition temperature of the polymer and improve the toughness and peel strength of the polymer, which helps to exert good adhesion. The second structural unit can produce excellent swelling resistance and high adhesion, and help to improve the ion conductivity of the secondary battery. When the polymer is applied to the separator, the polymer is in contact with the electrolyte, and the polymer is not prone to swelling, which has good swelling resistance. The third structural unit can endow the polymer with advantages in heat resistance and mechanical performance, and can ensure the stability of the polymer and effectively separate the positive electrode plate from the negative electrode plate during long-term charge and discharge cycles of the secondary battery, thereby ensuring the safety performance of the secondary battery. The first structural unit and the third structural unit can work synergistically to improve the adhesion and heat resistance of the polymer; and the first structural unit and the second structural unit can work synergistically to improve the stability and swelling resistance of the polymer. The three structural units in the polymer work synergistically to improve the adhesion, stability, swelling resistance, and thermal stability of the polymer.

In some embodiments, $R_1$ includes hydrogen atom or methyl; and/or $R_2$ includes methyl, ethyl, n-propyl, isopropyl, n-butyl, sec-butyl, tert-butyl, n-pentyl, n-octyl, isooctyl, 2-ethylhexyl, dodecyl, or isobornyl.

In some embodiments, $R_3$ includes hydrogen atom or methyl.

In some embodiments, $R_4$ to $R_{11}$ each independently include the structural unit represented by formula (III-1); optionally, $R_{12}$ includes hydrogen atom, methyl, ethyl, n-propyl, isopropyl, n-butyl, sec-butyl, tert-butyl, or n-pentyl; and/or $R_{13}$ includes n-propyl, isopropyl, n-butyl, sec-butyl, tert-butyl, n-pentyl, n-octyl, isooctyl, or 2-ethylhexyl.

In some embodiments, one of $R_4$ to $R_{11}$ includes the structural unit represented by formula (III-1); optionally, $R_{12}$ includes hydrogen atom, methyl, ethyl, n-propyl, isopropyl, n-butyl, sec-butyl, tert-butyl, or n-pentyl; and/or $R_{13}$ includes n-propyl, isopropyl, n-butyl, sec-butyl, tert-butyl, n-pentyl, n-octyl, isooctyl, or 2-ethylhexyl.

In some embodiments, based on a total molar mass of the first structural unit, the second structural unit, and the third structural unit, a molar percentage of the first structural unit is denoted as A %, where $60 \leq A < 100$; and optionally, $60 \leq A \leq 80$. With the molar percentage within the foregoing range, the first structural unit has a relatively large proportion in the polymer, which can improve the flexibility of the polymer, thereby significantly improving the adhesion of the polymer. When the polymer is applied to the separator, the bonding strength between the polymer and the substrate of the separator can be improved.

In some embodiments, based on the total molar mass of the first structural unit, the second structural unit, and the third structural unit, a molar percentage of the second structural unit is denoted as B %, where $0 < B \leq 20$; and optionally, $5 \leq B \leq 20$. With the molar percentage of the second structural unit within the foregoing range, the stability of the polymer can be significantly improved.

In some embodiments, based on the total molar mass of the first structural unit, the second structural unit, and the third structural unit, a molar percentage of the third structural unit is denoted as C %, where $0 < C \leq 20$; and optionally, $5 \leq C \leq 20$. With the molar percentage of the third structural unit within the foregoing range, the heat resistance of the polymer can be ensured, and the third structural unit has a relatively small proportion, which is conducive to increasing the proportions of the first structural unit and the second structural unit, and improving the overall adhesion, stability, and swelling resistance of the polymer.

In some embodiments, based on the total molar mass of the first structural unit, the second structural unit, and the third structural unit, the molar percentage of the first structural unit is denoted as A %, the molar percentage of the second structural unit is denoted as B %, and the molar percentage of the third structural unit is denoted as C %; and the polymer satisfies one or more of conditions (1) to (3): (1) $3 \leq A/B \leq 16$; (2) $3 \leq A/C \leq 16$; (3) A:B:C being (12 to 16):(1 to 4):(1 to 4). When the molar percentages of the first structural unit, the second structural unit, and the third structural unit satisfy the above ratios, the three structural units work synergistically to further improve the adhesion, stability, swelling resistance, and thermal stability of the polymer.

In some embodiments, the number-average molar mass of the polymer is 20000 to 80000, and optionally 30000 to 50000. When the number-average molar mass of the polymer is within the foregoing range, it is conducive to forming polymer particles with smaller particle size. When the polymer is applied to the separator, thin coating of the coating layer in the separator can be achieved, reducing the overall thickness of the separator, thereby facilitating the improvement of the energy density of the secondary battery; and the particle size of the polymer particles formed by the polymer will not be too small, which can reduce the risk of the polymer particles clogging the substrate of the separator, and improve the overall air permeability and other performances of the separator. In some embodiments, the polymer is granular, and the polymer further satisfies one or more of conditions (I) to (III): (I) the polymer has a spherical and/or spheroidal morphology; (II) a volume distribution particle size $D_v50$ of the polymer satisfies $0.1\ \mu m \leq D_v50 \leq 2.0\ \mu m$; and optionally, $0.5\ \mu m \leq D_v50 \leq 1.2\ \mu m$; (III) a specific surface area of the polymer is denoted as S, in $m^2/g$, where $5.0 \leq S \leq 12.0$; and optionally, $6.0 \leq S \leq 10.0$. When the polymer is granular and satisfies at least one of the foregoing conditions, the adhesion, stability, swelling resistance, and heat resistance of the polymer can be further improved.

A second aspect of this application provides a method for preparing a polymer. The method is used to prepare the polymer according to any one of embodiments of the first aspect of this application, and the method includes: providing a first monomer, a second monomer, and a third monomer; and mixing the first monomer, the second monomer, and the third monomer, and polymerizing them under the action of an initiator to produce the polymer, where the first monomer includes a compound represented by formula (IV):

formula (IV)

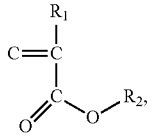

where in formula (IV), $R_1$ includes one or more of hydrogen atom and substituted or unsubstituted C1-C5 alkyl; and optionally, $R_1$ includes one or more of hydrogen atom and substituted or unsubstituted C1-C3 alkyl; and $R_2$ includes one or more of substituted or unsubstituted C1-C20 alkyl, substituted or unsubstituted C3-C20 cycloalkyl, and substituted or unsubstituted C1-C20 hydroxyalkyl; and optionally, $R_2$ includes one or more of C1-C12 alkyl, C3-C12 cycloalkyl, and C1-C12 hydroxyalkyl;

the second monomer includes a compound represented by formula (V):

formula (V)

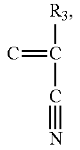

where in formula (V), $R_3$ includes one or more of hydrogen atom and substituted or unsubstituted C1-C5 alkyl; and optionally, $R_3$ includes one or more of hydrogen atom and substituted or unsubstituted C1-C3 alkyl; and the third monomer includes a compound represented by formula (VI):

formula (VI)

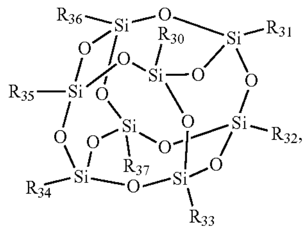

where in formula (VI), $R_{30}$ to $R_{37}$ each independently include one or more of substituted or unsubstituted C1-C10 alkyl, for example, one or more of a structural unit represented by formula (VI-1), and at least one of $R_{30}$ to $R_{37}$ includes the structural unit represented by formula (VI-1):

formula (VI-1)

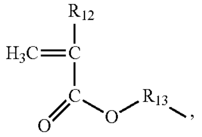

where in formula (VI-1), $R_{12}$ includes one or more of hydrogen atom and substituted or unsubstituted C1-C5 alkyl; and optionally, $R_{12}$ includes one or more of hydrogen atom and substituted or unsubstituted C1-C3 alkyl, and $R_{13}$ includes substituted or unsubstituted C1-C10 alkyl; and optionally, $R_{13}$ includes substituted or unsubstituted C3-C10 alkyl.

In some embodiments, the step of mixing the first monomer, the second monomer, and the third monomer, and polymerizing them under the action of an initiator to produce the polymer includes: adding the first monomer, the second monomer, and the third monomer into a solvent and an emulsifier and mixing them to produce a mixed system; and adding the initiator into the mixed system, and polymerizing them under the action of the initiator to produce the polymer.

In some embodiments, the first monomer includes one or more of methyl acrylate, ethyl acrylate, n-propyl acrylate, isopropyl acrylate, n-butyl acrylate, isobutyl acrylate, sec-butyl acrylate, tert-butyl acrylate, n-pentyl acrylate, n-octyl acrylate, isooctyl acrylate, 2-ethylhexyl acrylate, cyclohexyl acrylate, lauryl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate.

In some embodiments, the second monomer includes acrylonitrile and/or methacrylonitrile.

In some embodiments, the third monomer includes one or more of methacryloxypropyl cage-type polysilsesquioxane, methacryloxypropyl hepta-isobutyl polysilsesquioxane, methacryloxypropyl hepta-octyl polysilsesquioxane, acryloxypropyl cage-type polysilsesquioxane, acryloxypropyl hepta-isobutyl polysilsesquioxane, and methacryloxypropyl hepta-octyl polysilsesquioxane.

A third aspect of this application further provides a separator. The separator includes a substrate and a coating layer disposed on at least one surface of the substrate, where the coating layer includes the polymer according to any one of embodiments of the first aspect of this application or a polymer prepared by the method according to any one of embodiments of the second aspect of this application.

In some embodiments, based on a mass of the coating layer, a mass percentage of the polymer is denoted as m %, where $m \geq 70$; and optionally, $80 \leq m \leq 95$. When the mass percentage of the polymer is within the foregoing range the overall adhesion, stability, swelling resistance, and heat resistance of the separator can be further improved.

In some embodiments, the separator satisfies one or more of conditions (A) to (G):

(A) the separator has a machine direction thermal shrinkage rate $\eta_1 \leq 5.0\%$ at 150° C. for 1 h, and optionally, $0.5\% \leq \eta_1 \leq 3\%$;

(B) the separator has a transverse direction thermal shrinkage rate $\eta_2 \leq 5.0\%$ at 150° C. for 1 h, and optionally, $0.5\% \leq \eta_2 \leq 2\%$;

(C) the separator has a machine direction tensile strength $R_{m1} \geq 3000$ kg/cm$^2$, and optionally, 3500 kg/cm$^2 \leq R_{m1} \leq 4500$ kg/cm$^2$;

(D) the separator has a transverse direction tensile strength $R_{m2} \geq 3000$ kg/cm$^2$, and optionally, 3500 kg/cm$^2 \leq R_{m2} \leq 4500$ kg/cm$^2$;

(E) the separator has an air permeability MAP≤250 s/100 mL, and optionally, 120 s/100 mL≤MAP≤180 s/100 mL;

(F) the separator has a wetted length L≥30 mm, and optionally, 30 mm≤L≤80 mm; and (G) the separator has a wetted velocity u≥3 mm/s, and optionally, 3 mm/s≤u≤10 mm/s.

A third aspect of this application further provides a secondary battery. The secondary battery includes the separator according to any one of embodiments of the second aspect of this application.

A fourth aspect of this application further provides an electric apparatus. The electric apparatus includes the secondary battery according to the third aspect of this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

Figure 1:
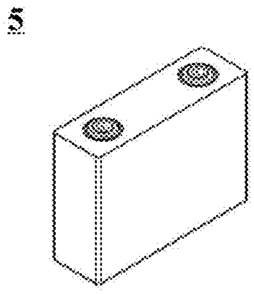
FIG. 1 is a schematic diagram of an embodiment of a secondary battery in this application.

The figures are not necessarily drawn to scale.

REFERENCE SIGNS

1. battery pack; 2. upper box body; 3. lower box body; 4. battery module;

5. secondary battery; 51. housing; 52. electrode assembly;

53. cover plate; and

6. electric apparatus.

DETAILED DESCRIPTION

The following specifically discloses in detail embodiments of the polymer, separator, and related secondary battery and electric apparatus of this application. However, there may be cases where unnecessary detailed descriptions are omitted. For example, detailed descriptions of well-known matters and repeated descriptions of actually identical structures have been omitted. This is to avoid unnecessarily prolonging the following descriptions, for ease of understanding by persons skilled in the art. In addition, the accompanying drawings and the following descriptions are provided for those skilled in the art to fully understand this application and are not intended to limit the subject described in the claims.

"Ranges" disclosed in this application are defined in the form of lower and upper limits. A given range is defined by one lower limit and one upper limit selected, where the selected lower and upper limits define boundaries of that special range. Ranges defined in this way may or may not include end values, and any combination may be used, meaning that any lower limit may be combined with any upper limit to form a range. For example, if ranges of 60-120 and 80-110 are provided for a specific parameter, it is understood that ranges of 60-110 and 80-120 can also be envisioned. In addition, if minimum limit values of a range are given as 1 and 2, and maximum limit values of the range are given as 3, 4, and 5, the following ranges can all be envisioned: 1-3, 1-4, 1-5, 2-3, 2-4, and 2-5. In this application, unless otherwise specified, a value range of "a-b" is a short representation of any combination of real numbers between a and b, where both a and b are real numbers. For example, a value range of "0-5" means that all real numbers in the range of "0-5" are listed herein and "0-5" is just a short representation of combinations of these values. In addition, a parameter expressed as an integer greater than or equal to 2 is equivalent to disclosure that the parameter is, such as, an integer among 2, 3, 4, 5, 6, 7, 8, 9, 10, 11, 12, and so on.

Unless otherwise stated, all the embodiments and optional embodiments of this application can be combined with each other to form new technical solutions. Unless otherwise stated, all the technical features and optional technical features of this application can be combined with each other to form new technical solutions.

Unless otherwise stated, all the steps in this application can be performed in the order described or in random order, preferably, in the order described. For example, a method including steps (a) and (b) indicates that the method may include steps (a) and (b) performed in order or may include steps (b) and (a) performed in order. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components are included or contained.

Unless otherwise specified, in this application, the term "or" is inclusive. For example, a phrase "A or B" means "A, B, or both A and B". More specifically, any one of the following conditions satisfies the condition "A or B": A is true (or present) and B is false (or not present); A is false (or not present) and B is true (or present); or both A and B are true (or present).

In this application, the term "a plurality of" means two or more than two and the term "a plurality of types" means two types or more than two types.

Unless otherwise specified, the terms used in this application have well known meanings commonly understood by persons skilled in the art.

Unless otherwise specified, numerical values of parameters mentioned in this application may be measured by using various measurement methods commonly used in the art, for example, they may be measured by using the methods provided in the embodiments of this application.

The term "alkyl" covers linear and branched alkyl groups. For example, the alkyl may be C1-C50 alkyl, C1-C40 alkyl, C1-C30 alkyl, C1-C20 alkyl, C1-C12 alkyl, C1-C10 alkyl, C1-C6 alkyl, C1-C5 alkyl, or C1-C3 alkyl. In some embodiments, the alkyl includes methyl, ethyl, propyl, isopropyl, butyl, isobutyl, tert-butyl, pentyl, hexyl, heptyl, octyl, and the like. In addition, the alkyl may be optionally substituted.

The term "cycloalkyl" refers to a cyclic structure composed of three or more carbon atoms. For example, the cycloalkyl may be C3-C50 cycloalkyl, C3-C40 cycloalkyl, C3-C30 cycloalkyl, C3-C20 cycloalkyl, C3-C12 cycloalkyl, C3-C10 cycloalkyl, C3-C6 cycloalkyl, or C3-C4 cycloalkyl. In some embodiments, the cycloalkyl includes cyclopropyl, cycloisopropyl, cyclobutyl, cycloisobutyl, tert-butyl, cyclopentyl, cyclohexyl, cycloheptyl, cyclooctyl, and the like. In addition, the cycloalkyl may be optionally substituted.

The term "hydroxyalkyl" refers to alkyl in which one hydrogen atom is replaced by hydroxyl. For example, the hydroxyalkyl may be C1-C50 hydroxyalkyl, C1-C40 hydroxyalkyl, C1-C30 hydroxyalkyl, C1-C20 hydroxyalkyl, C1-C12 hydroxyalkyl, C1-C10 hydroxyalkyl, C1-C6 hydroxyalkyl, C1-C5 hydroxyalkyl, or C1-C3 hydroxyalkyl. In some embodiments, the hydroxyalkyl includes hydroxymethyl, hydroxyethyl, hydroxypropyl, hydroxyisopropyl, hydroxybutyl, hydroxyisobutyl, hydroxyt-butyl, hydroxypentyl, hydroxyhexyl, hydroxyheptyl, hydroxyoctyl, and the like. In addition, the hydroxyalkyl may be optionally substituted.

The term "hydrogen" refers to 1H (protium, H), 2H (deuterium, D), or 3H (tritium, T). In the various embodiments, "hydrogen" may be 1H (protium, H).

Throughout this specification, substituents of compounds are disclosed in groups or ranges. This description explicitly contemplates to include each individual subcombination of members of these groups and ranges. For example, the term "C1-C8 alkyl" explicitly contemplates the individual disclosure of C1 alkyl, C2 alkyl, C3 alkyl, C4 alkyl, C5 alkyl, C6 alkyl, C7 alkyl, C8 alkyl, C1-C8 alkyl, C1-C7 alkyl, C1-C6 alkyl, C1-C5 alkyl, C1-C4 alkyl, C1-C3 alkyl, C1-C2 alkyl, C2-C8 alkyl, C2-C7 alkyl, C2-C6 alkyl, C2-C5 alkyl, C2-C4 alkyl, C2-C3 alkyl, C3-C8 alkyl, C3-C7 alkyl, C3-C6 alkyl, C3-C5 alkyl, C3-C4 alkyl, C4-C8 alkyl, C4-C7 alkyl, C4-C6 alkyl, C4-C5 alkyl, C5-C8 alkyl, C5-C7 alkyl, C5-C6 alkyl, C6-C8 alkyl, C6-C7 alkyl, and C7-C8 alkyl.

In another example, a range of integers from 5 to 40 explicitly contemplates the individual disclosure of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40; a range of integers from 1 to 20 explicitly contemplates the individual disclosure of 1, 2, 3, 4, 5, 6, 7, 8, 9, 10, 11, 12, 13, 14, 15, 16, 17, 18, 19, and 20. Accordingly, other groups or ranges can be explicitly contemplated.

When the groups mentioned above are substituted, the substituents may be halogen atoms or heteroatoms.

The term "halogen atom" refers to fluorine atom, chlorine atom, bromine atom, or the like.

The term "heteroatom" refers to nitrogen atom, sulfur atom, phosphorus atom, or the like.

Typically, a secondary battery includes an electrode assembly and an electrolyte. The electrode assembly includes a positive electrode plate, a negative electrode plate, and a separator. The separator is disposed between the positive electrode plate and the negative electrode plate, mainly to prevent short circuit between the positive electrode plate and the negative electrode plate and allow active ions to pass through freely to form a closed loop.

With the application and promotion of secondary batteries, the performance (such as safety performance) requirements for secondary batteries are becoming increasingly stringent. The separator is an important component of the secondary battery, and its performance can be improved to enhance the safety performance of the secondary battery.

The inventors have found that the separator in the related art has poor adhesion, and the adhesion effect between the separator and the positive and negative electrode plates is poor. Usually, a coating layer containing a polymer is applied on the substrate to improve the adhesion of the separator. However, the coating layer of the polymer still has the problem of high-temperature shrinkage. Specifically, during the long-term charge and discharge process of the secondary battery, heat is released, causing the temperature inside the secondary battery to rise, and the separator, due to its poor heat resistance, has a high shrinkage rate at high temperatures, making it difficult for the separator to effectively separate the positive electrode plate from the negative electrode plate, thereby deteriorating the safety performance of the secondary battery. In addition, the separator also needs to have good swelling resistance when wetted by the electrolyte, because if the separator swells easily, its volume will increase significantly, which may squeeze and adversely affect the positive and negative electrode plates. Therefore, it can be seen that the separator in the related art is difficult to balance adhesion, heat resistance, and swelling resistance.

To solve the above issue, the inventors have improved the performance of the coating layer of the separator. The coating layer includes a polymer formed by the polymerization of monomers with multiple functions, thereby improving the performance of the separator. The technical solutions of this application are described in detail below.

Polymer

According to a first aspect, this application provides a polymer, where the polymer includes a first structural unit, a second structural unit, and a third structural unit.

The first structural unit includes a structural unit represented by formula (I):

formula (I)

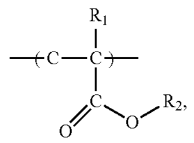

where in formula (I), $R_1$ includes one or more of hydrogen atom and substituted or unsubstituted C1-C5 alkyl; and optionally, $R_1$ includes one or more of hydrogen atom and substituted or unsubstituted C1-C3 alkyl; and $R_2$ includes one or more of substituted or unsubstituted C1-C20 alkyl, substituted or unsubstituted C3-C20 cycloalkyl, and substituted or unsubstituted C1-C20 hydroxyalkyl; and optionally, $R_2$ includes one or more of C1-C12 alkyl, C3-C12 cycloalkyl, and C1-C12 hydroxyalkyl.

The second structural unit includes a structural unit represented by formula (II):

formula (II)

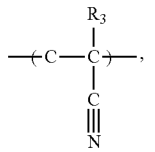

where in formula (II), $R_3$ includes one or more of hydrogen atom and substituted or unsubstituted C1-C5 alkyl; and optionally, $R_3$ includes one or more of hydrogen atom and substituted or unsubstituted C1-C3 alkyl.

The third structural unit includes a structural unit represented by formula (III):

formula (III)

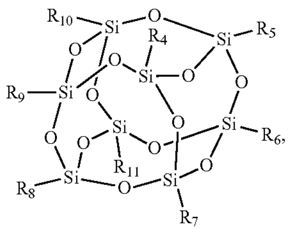

where in formula (III), $R_4$ to $R_{11}$ each independently include one or more of substituted or unsubstituted C1-C10 alkyl, for example, one or more of a structural unit represented by formula (III-1), and at least one of $R_4$ to $R_{11}$ includes the structural unit represented by formula (III-1):

formula (III-1)

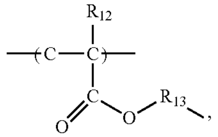

where in formula (III-1), $R_{12}$ includes one or more of hydrogen atom and substituted or unsubstituted C1-C5 alkyl; and optionally, $R_{12}$ includes one or more of hydrogen atom and substituted or unsubstituted C1-C3 alkyl; and $R_{13}$ includes substituted or unsubstituted C1-C10 alkyl; and optionally, $R_{13}$ includes substituted or unsubstituted C3-C10 alkyl.

The polymer of this application includes the first structural unit, the second structural unit, and the third structural unit, which have good adhesion, stability, swelling resistance, and heat resistance.

Although the mechanism is not fully established, the inventors of this application speculate that the possible reasons include the following points:

The first structural unit may be formed by opening the carbon-carbon double bond of the acrylate monomer during polymerization. The flexible monomer chain segment in the molecular chain segment can adjust the glass transition temperature of the polymer and improve the toughness and peel strength of the polymer, which helps to exert good adhesion.

The second structural unit may be formed by opening the carbon-carbon double bond of the acrylonitrile monomer during polymerization. The second structural unit can produce excellent swelling resistance and high adhesion, and help to improve the ion conductivity of the secondary battery. When the polymer is applied to the separator, the polymer is in contact with the electrolyte, and the polymer is not prone to swelling, which has good swelling resistance.

The third structural unit is formed by opening the carbon-carbon double bond of the substituted or unsubstituted acryloxyalkyl polysilsesquioxane during polymerization. Polysilsesquioxane can be considered as a material with an organic-inorganic hybrid core-shell structure. Its internal inorganic framework serves as the core, that is, the Si—O—Si or Si—O bond forms the skeleton structure; its shell is composed of organic substituents (C1-C5 alkyl), and the organic substituents wrap around the skeleton structure and are connected to element Si of the skeleton structure. The internal structure of polysilsesquioxane can endow the polymer with advantages in heat resistance and mechanical performance, has poor shrinkage, and can ensure the stability of the polymer and effectively separate the positive electrode plate from the negative electrode plate during long-term charge and discharge cycles of the secondary battery, thereby ensuring the safety performance of the secondary battery. Because polysilsesquioxane has a small particle size and large specific surface area, it is similar to most polymer chain segments in physical scale, making the atoms on the surface of polysilsesquioxane highly reactive. The polymer modified by polysilsesquioxane has good heat resistance, flame retardancy, and oxidation resistance.

Although the above analysis is based on each structural unit, the synergistic effect between the structural units cannot be ignored. Specifically, the first structural unit and the third structural unit can work synergistically to improve the adhesion and heat resistance of the polymer; and the first structural unit and the second structural unit can work synergistically to improve the stability and swelling resistance of the polymer.

In some embodiments, based on a total molar mass of the first structural unit, the second structural unit, and the third structural unit, a molar percentage of the first structural unit is denoted as A %, where $60 \leq A < 100$. With the molar percentage within the foregoing range, the first structural unit has a relatively large proportion in the polymer, which can improve the flexibility of the polymer, thereby significantly improving the adhesion of the polymer. When the polymer is applied to the separator, the bonding strength between the polymer and the substrate of the separator can be improved. Optionally, $60 \leq A \leq 80$. For example, the molar percentage of the first structural unit may be 60%, 65%, 70%, 75%, 80%, or in a range defined by any two of these values.

In some embodiments, based on the total molar mass of the first structural unit, the second structural unit, and the third structural unit, a molar percentage of the second structural unit is denoted as B %, where $0 < B \leq 20$. With the molar percentage of the second structural unit within the foregoing range, the stability of the polymer can be significantly improved. Optionally, $5 \leq B \leq 20$. For example, the molar percentage of the second structural unit may be 2%, 5%, 8%, 10%, 12%, 15%, 18%, 20%, or in a range defined by any two of these values.

In some embodiments, based on the total molar mass of the first structural unit, the second structural unit, and the third structural unit, a molar percentage of the third structural unit is denoted as C %, where $0 < C \leq 20$. With the molar percentage of the third structural unit within the foregoing range, the heat resistance of the polymer can be ensured, and the third structural unit has a relatively small proportion, which is conducive to increasing the proportions of the first structural unit and the second structural unit, and improving the overall adhesion, stability, and swelling resistance of the polymer. Optionally, $5 \leq C \leq 20$. For example, the molar percentage of the third structural unit may be 2%, 5%, 8%, 10%, 12%, 15%, 18%, 20%, or in a range defined by any two of these values.

The polymer includes the first structural unit, and the first structural unit endows the polymer with good adhesion and flexibility. However, because the polymer will inevitably come into contact with the electrolyte when applied to the separator, the swelling effect of the electrolyte will reduce the adhesion of the polymer to some extent. The polymer further includes the second structural unit, and a cyano group in the second structural unit can work synergistically with the first structural unit to jointly improve the swelling resistance and adhesion of the polymer. Especially when $3 \leq A/B \leq 16$ is further satisfied, the first structural unit and the second structural unit can more fully exert their synergistic effect, improving the adhesion, stability, and swelling resistance of the polymer. For example, A/B may be 3, 4, 5, 8, 10, 12, 15, 16, or in a range defined by any two of these values.

The polymer includes the first structural unit, and the first structural unit endows the polymer with good adhesion, but itself has relatively poor heat resistance. When the polymer is applied to the separator, as the charge and discharge time of the secondary battery increases, the temperature inside the secondary battery rises, which may cause damage to the first structural unit. The polymer further includes the third structural unit, and an inorganic structure of polysilsesquioxane in the third structural unit can work synergistically with the first structural unit to improve the overall heat resistance and adhesion properties of the polymer. Especially when 3≤A/

C≤16 is further satisfied, the first structural unit and the third structural unit can more fully exert their synergistic effect, improving the adhesion and heat resistance of the polymer. For example, A/C can be 3, 4, 5, 8, 10, 12, 15, 16, or in a range defined by any two of these values.

In some embodiments, A:B:C is (12 to 16):(1 to 4):(1 to 4). When the molar percentages of the first structural unit, the second structural unit, and the third structural unit satisfy the foregoing ratios, the three structural units in the polymer work synergistically to improve the adhesion, stability, swelling resistance, and thermal stability of the polymer. For example, A:B:C may be 12:4:4, 13:4:3, 14:4:2, 15:4:1, 16:3:1, 13:3:4, or 15:1:4. The first structural unit includes various chemical structures, and the specific chemical structures of the first structural unit are explained below.

In some embodiments, $R_1$ includes hydrogen atom or methyl.

In some embodiments, $R_2$ includes methyl, ethyl, n-propyl, isopropyl, n-butyl, sec-butyl, tert-butyl, n-pentyl, n-octyl, isooctyl, 2-ethylhexyl, dodecyl, or isobornyl.

For example, the first structural unit includes one or more of the structures shown in formulas (I-1) to (I-8):

formula (I-1)

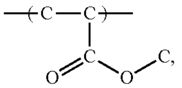

formula (I-2)

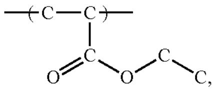

formula (I-3)

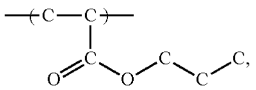

formula (I-4)

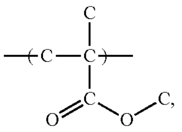

formula (I-5)

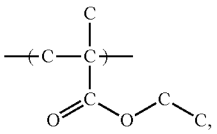

formula (I-6)

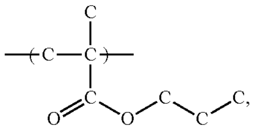

formula (I-7)

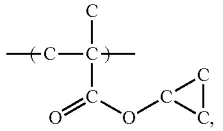

and formula (I-8)

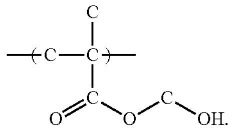

The second structural unit includes various chemical structures, and the specific chemical structures of the second structural unit are explained below.

In some embodiments, $R_3$ includes hydrogen atom or methyl.

For example, the second structural unit includes one or more of the structures shown in formulas (II-1) to (II-4):

formula (II-1)

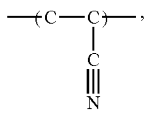

formula (II-2)

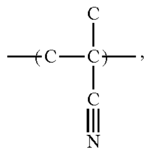

formula (II-3)

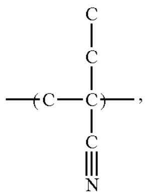

and formula (II-4)

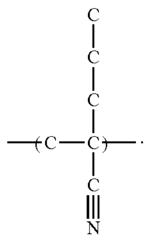

The third structural unit includes various chemical structures, and the specific chemical structures of the third structural unit are explained below.

In some embodiments, $R_4$ to $R_{11}$ each independently include a structural unit represented by formula (III-1); optionally, $R_{12}$ includes hydrogen atom, methyl, ethyl, n-propyl, isopropyl, n-butyl, sec-butyl, tert-butyl, or n-pentyl; and/or $R_{13}$ includes n-propyl, isopropyl, n-butyl, sec-butyl, tert-butyl, n-pentyl, n-octyl, isooctyl, or 2-ethylhexyl.

In some embodiments, one of $R_4$ to $R_{11}$ includes the structural unit represented by formula (III-1); optionally, $R_{12}$ includes hydrogen atom, methyl, ethyl, n-propyl, isopropyl, n-butyl, sec-butyl, tert-butyl, or n-pentyl; and/or $R_{13}$ includes n-propyl, isopropyl, n-butyl, sec-butyl, tert-butyl, n-pentyl, n-octyl, isooctyl, or 2-ethylhexyl.

The types of groups in the polymer can be determined by infrared spectroscopy. For example, the infrared spectrum of the material can be tested to determine characteristic peaks that the material contains, so as to determine the type of the modified group. Specifically, the infrared spectrum analysis can be performed on the material by using instruments and methods known in the art. The test is performed by using an infrared spectrometer (for example, an IS10 Fourier transform infrared spectrometer from Nicolet (nicolet) of the United States) in accordance with the general rules of GB/T 6040-2019 infrared spectroscopy method.

In some embodiments, the infrared spectrum of the polymer has a characteristic peak at 1750 $cm^{-1}$ to 1735 $cm^{-1}$, indicating the presence of an ester group.

In some embodiments, the infrared spectrum of the polymer has a characteristic peak at 2260 $cm^{-1}$ to 2220 $cm^{-1}$, indicating the presence of a cyano group.

In some embodiments, the infrared spectrum of the polymer has a characteristic peak at 1100 $m^{-1}$ to 1120 $cm^{-1}$, indicating the presence of the Si—O—Si skeleton of polysilsesquioxane.

The inventors have further found that when specific parameters of the polymer are within specific ranges, the adhesion and stability of the polymer can be significantly improved.

In some embodiments, a number-average molar mass of the polymer is 20000 to 80000, and optionally 30000 to 50000. For example, the number-average molar mass of the polymer may be 20000, 25000, 30000, 35000, 40000, 45000, 50000, 55000, 60000, 65000, 70000, 75000, 80000, or in a range defined by any two of these values. When the number-average molar mass of the polymer is within the foregoing range, it is conducive to forming polymer particles with smaller particle size. When the polymer is applied to the separator, thin coating of the coating layer in the separator can be achieved, reducing the overall thickness of the separator, thereby facilitating the improvement of the energy density of the secondary battery; and the particle size of the polymer particles formed by the polymer will not be too small, which can reduce the risk of the polymer particles clogging the substrate of the separator, and improve the overall air permeability and other performances of the separator.

The number-average molar mass of the polymer can be tested using gel permeation chromatography (GPC). Specifically, the test is conducted using a GPC1515 instrument from Waters Corporation of the United States. A sample of the polymer is dissolved in tetrahydrofuran, with a dissolution time of more than 12 h, to prepare a sample solution with a concentration of 4 mg/ml. After filtration, the test is conducted at a temperature of 25° C. and a flow rate of 1 ml/min.

The inventors have further found that when the polymer is granular and satisfies at least one of the following conditions, the adhesion, stability, swelling resistance, and heat resistance of the polymer can be further improved.

In some embodiments, the polymer has a spherical and/or spheroidal morphology. When the polymer is applied to the separator, the polymer presents granular, spherical, and/or spheroidal particles, which can ensure good overlap between particles, and there are gaps between particles, which is conducive to constructing a stable spatial network structure, thereby improving the ion transport characteristics and external extrusion resistance of the separator. Moreover, larger gaps between spherical and/or spheroidal particles can mitigate the impact of the coating layer on the air permeability of the substrate, further improving the overall air permeability and ion conductivity of the separator, and enhancing the kinetic performance of the secondary battery. Furthermore, a larger porosity between spherical and/or spheroidal particles helps to improve the wettability of the separator to the electrolyte, as well as the electrolyte holding capacity and electrolyte retention of the separator, further enhancing the kinetic performance of the secondary battery. In addition, the larger porosity can reduce the weight, which helps to increase the energy density per unit weight of the secondary battery; and can reduce the amount of polymer used in the coating layer, which helps to reduce the cost of the secondary battery.

The morphology of the polymer can be observed using a scanning electron microscope SEM, for example, using a JSM-5610LV scanning electron microscope from FEI Company of the United States. A sample is vacuum gold-sprayed and then observed for morphological structure.

In some embodiments, a volume distribution particle size $D_v50$ of the polymer satisfies 0.1 μm≤$D_v50$≤2.0 μm; and optionally, 0.5 μm≤$D_v50$≤1.2 μm. The particle size of the polymer is relatively small, which is conducive to the uniform dispersion of the polymer when applied to the separator, resulting in a more uniform film performance. For example, the volume distribution particle size $D_v50$ of the polymer may be 0.1 μm, 0.2 μm, 0.5 μm, 0.8 μm, 1.0 μm, 1.2 μm, 1.5 μm, 2.0 μm, or in a range defined by any two of these values.

The volume distribution particle size $D_v50$ of the polymer is a well-known meaning in the art and can be measured using known instruments and methods in the art. For example, it can be measured in accordance with GB/T 19077-2016 using a laser particle size analyzer (for example, Master Size 3000).

In some embodiments, a specific surface area of the polymer is denoted as S, in $m^2/g$, where 5.0≤S≤12.0; and optionally, 6.0≤S≤10.0. The specific surface area of the polymer being within the foregoing range indicates a relatively large specific surface area of the polymer, which is conducive to good overlap between particles, making it easier for polymer particles to form a porous structure, and conducive to the migration of active ions. For example, the specific surface area of the polymer may be 5.0 $m^2/g$, 5.5 $m^2/g$, 6.0 $m^2/g$, 7.0 $m^2/g$, 8.0 $m^2/g$, 9.0 $m^2/g$, 10.0 $m^2/g$, 11.0 $m^2/g$, 12.0 $m^2/g$, or in a range defined by any two of these values.

The specific surface area of the polymer is a well-known meaning in the art and can be measured using known instruments and methods in the art. For example, the specific surface area can be measured in accordance with GB/T 19587-2017 using the nitrogen adsorption specific surface area analysis test method and calculated using the BET (Brunauer Emmett Teller) method. Optionally, the nitrogen adsorption specific surface area analysis test may be carried out using a Tri-Star 3020 specific surface area and pore diameter analyzer from Micromeritics Company in the United States.

Method for Preparing Polymer

According to a second aspect, this application provides a method for preparing a polymer. The method can be used to prepare the polymer according to any one of the embodiments of the first aspect of this application.

The method includes the following steps.

Step S100: Provide a first monomer, a second monomer, and a third monomer;

Step S200: Mix the first monomer, the second monomer, and the third monomer, and polymerize them under the action of an initiator to produce the polymer.

In this application, the first monomer, the second monomer, and the third monomer are mixed and then copolymerized, where the polymer produced is a copolymer of the three monomers.

The first monomer includes a compound represented by formula (IV), formula (IV)

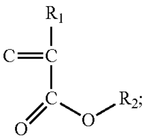

and in formula (IV), $R_1$ includes one or more of hydrogen atom and substituted or unsubstituted C1-C5 alkyl; and optionally, $R_1$ includes one or more of hydrogen atom and substituted or unsubstituted C1-C3 alkyl; and $R_2$ includes one or more of substituted or unsubstituted C1-C20 alkyl, substituted or unsubstituted C3-C20 cycloalkyl, and substituted or unsubstituted C1-C20 hydroxyalkyl; and optionally, $R_2$ includes one or more of C1-C12 alkyl, C3-C12 cycloalkyl, and C1-C12 hydroxyalkyl.

The first monomer is an acrylate compound, which forms the first structural unit by opening the carbon-carbon double bond during polymerization.

For example, the first monomer includes one or more of methyl acrylate, ethyl acrylate, n-propyl acrylate, isopropyl acrylate, n-butyl acrylate, isobutyl acrylate, sec-butyl acrylate, tert-butyl acrylate, n-pentyl acrylate, n-octyl acrylate, isooctyl acrylate, 2-ethylhexyl acrylate, cyclohexyl acrylate, lauryl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate.

The second monomer includes a compound represented by formula (V), formula (V)

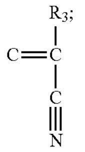

and in formula (V), $R_3$ includes one or more of hydrogen atom and substituted or unsubstituted C1-C5 alkyl; and optionally, $R_3$ includes one or more of hydrogen atom and substituted or unsubstituted C1-C3 alkyl.

The second monomer is an acrylonitrile compound. The second structural unit is formed by opening the carbon-carbon double bond during polymerization.

For example, the second monomer includes acrylonitrile and/or methacrylonitrile.

The third monomer includes a compound represented by formula (VI), formula (VI)

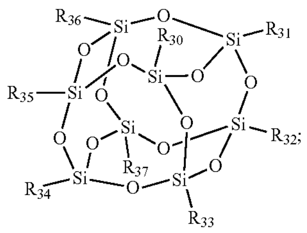

and in formula (VI), $R_{30}$ to $R_{37}$ each independently include one or more of substituted or unsubstituted C1-C10 alkyl, for example, one or more of a structural unit represented by formula (VI-1), and at least one of $R_{30}$ to $R_{37}$ includes a structural unit represented by formula (VI-1);

formula (VI-1)

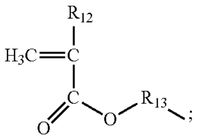

and in formula (VI-1), $R_{12}$ includes one or more of hydrogen atom and substituted or unsubstituted C1-C5 alkyl; and optionally, $R_{12}$ includes one or more of hydrogen atom and substituted or unsubstituted C1-C3 alkyl; and $R_{13}$ includes substituted or unsubstituted C1-C10 alkyl; and optionally, $R_{13}$ includes substituted or unsubstituted C3-C10 alkyl.

For example, the third monomer includes one or more of methacryloxypropyl cage-type polysilsesquioxane, methacryloxypropyl hepta-isobutyl polysilsesquioxane, methacryloxypropyl hepta-octyl polysilsesquioxane, acryloxypropyl cage-type polysilsesquioxane, acryloxypropyl hepta-isobutyl polysilsesquioxane, and methacryloxypropyl hepta-octyl polysilsesquioxane.

In some embodiments, step S200 specifically includes:

Step S210: adding the first monomer, the second monomer, and the third monomer into a solvent and an emulsifier and mixing them to produce a mixed system; and Step S220: adding the initiator into the mixed system, and polymerizing them under the action of the initiator to produce the polymer.

This application can copolymerize multiple monomers through emulsion polymerization, making the polymerization method simpler. Certainly, other polymerization methods such as solution polymerization and suspension polymerization can also be used, and the process parameters used in the polymerization process can be selected from commonly used parameters in the art, which are not described herein.

In some embodiments, the emulsifier includes one or more of sodium dodecyl sulfate, sodium dodecylbenzene sulfonate, alkyl diphenyl oxide disulfonate, and ethoxylated alkylphenol sulfate ammonium.

In some embodiments, based on a total mass of the mixed system, a ratio of a mass percentage of the emulsifier to the mass percentage of the first monomer, the second monomer, and the third monomer is 0.1% to 5%, that is, the amount of the emulsifier is 0.1% to 5% of the total mass of the three monomers. With the mass percentage of the emulsifier within the foregoing range, the emulsifier can emulsify and disperse the first monomer, the second monomer, and the third monomer in the solvent to produce a relatively uniform system.

In some embodiments, the initiator includes potassium persulfate and/or ammonium persulfate.

In some embodiments, based on the total mass of the mixed system, a ratio of the mass percentage of the initiator to the mass percentage of the second monomer, the second monomer, and the third monomer is 0.15% to 1%, that is, the amount of the initiator is 0.15% to 1% of the total mass of the three monomers. With the mass percentage of the initiator within the foregoing range, sufficient polymerization can be ensured.

In some embodiments, the solvent can include water, such as deionized water.

In a specific embodiment, the method includes:

preparation of prepolymer: mixing deionized water, emulsifier, first polymerizable monomer, second polymerizable monomer, and third polymerizable monomer uniformly to produce a prepolymer; and preparation of polymer: adding emulsifier and deionized water into a container, stirring for 30 min to 60 min for emulsification to produce a uniform and stable emulsion; then slowly adding the prepolymer prepared in the previous step and the initiator solution (dissolving the initiator potassium persulfate and/or ammonium persulfate in deionized water to produce a solution) dropwise, after the dropwise addition is completed, heating the resulting solution to 90° C. to 110° C. and keeping at such temperature for 0.5 h, cooling the solution down to 40° C., adjusting the pH to 7 to 8 with ammonia water, and followed by filtering, discharging, and drying, to prepare the polymer.

Separator

According to a third aspect, this application provides a separator.

The separator includes a substrate and a coating layer disposed on at least one surface of the substrate, where the coating layer includes the polymer according to any one of the embodiments of the first aspect of this application or a polymer prepared by the method according to any one of the embodiments of the second aspect of this application. Because the polymer has excellent adhesion, stability, swelling resistance, and heat resistance, when applied to the coating layer of the separator, it can significantly improve the overall adhesion, stability, swelling resistance, and heat resistance of the separator.

In some embodiments, based on a mass of the coating layer, a mass percentage of the polymer is denoted as m %, where m≥70; and optionally, 80≤m≤95. With the mass percentage of the polymer within the foregoing range, the overall adhesion, stability, swelling resistance, and heat resistance of the separator can be further improved. The mass percentage of the polymer m % may be 70%, 80%, 85%, 86%, 88%, 90%, 92%, 95%, 98%, 99%, or in a range defined by any two of these values.

This application does not impose special restrictions on the material of the substrate, and any known substrate with good chemical stability and mechanical stability can be selected, for example, at least one of glass fiber, non-woven fabric, polyethylene, polypropylene, and polyvinylidene fluoride. The substrate may be a single-layer film or a multilayer composite film. When the substrate is a multilayer composite film, the layers may be made of the same material or different materials.

In some embodiments, the coating layer may further include a filler. Further, the filler may include at least one of inorganic particles and organic particles.

In some embodiments, the decomposition temperature of the filler may be above 200° C. Thus, the filler can have good thermal stability and is not easily decomposed, further improving the heat resistance of the separator.

Inorganic particles have high thermal stability and are not easily decomposed. In some embodiments, the inorganic particles may include at least one of inorganic particles with a dielectric constant above 5, inorganic particles with ionic conductivity but not storing ions, and inorganic particles capable of electrochemical reactions.

Optionally, the inorganic particles with a dielectric constant above 5 include at least one of boehmite, aluminum oxide, zinc oxide, silicon oxide, titanium oxide, zirconium oxide, barium oxide, calcium oxide, magnesium oxide, nickel oxide, tin oxide, cerium oxide, yttrium oxide, hafnium oxide, aluminum hydroxide, magnesium hydroxide, silicon carbide, boron carbide, aluminum nitride, silicon nitride, boron nitride, magnesium fluoride, calcium fluoride, barium fluoride, barium sulfate, magnesium aluminum silicate, lithium magnesium silicate, sodium magnesium silicate, bentonite, hectorite, zirconium titanate, barium titanate, $Pb(Zr,Ti)O_3$ (PZT for short), $Pb_{1-m}La_mZr_{1-a}Ti_nO_3$ (PLZT for short, where 0<m<1, and 0<n<1), $Pb(Mg_3Nb_{2/3})O_3—PbTiO_3$ (PMN-PT for short), and their respective modified inorganic particles. Optionally, the modification methods for the various inorganic particles may be chemical modification and/or physical modification. The chemical modification method includes coupling agent modification (for example, using a silane coupling agent and a titanate coupling agent), surfactant modification, polymer graft modification, and the like. The physical modification method includes mechanical force dispersion, ultrasonic dispersion, high-energy treatment, and the like. Through modification treatment, the agglomeration of inorganic particles can be reduced, thereby enabling them to form a more stable and uniform spatial network structure with nanocellulose. In addition, selection of coupling agents, surfactant materials, or polymers with specific functional groups for modifying inorganic particles also helps to improve the wettability of the coating layer to the electrolyte and the bonding strength between the coating layer and the substrate.

Optionally, the inorganic particles with ionic conductivity but not storing ions include at least one of $Li_3PO_4$, lithium titanium phosphate $Li_{x1}Ti_{y1}(PO_4)_3$, lithium aluminum titanium phosphate $Li_{x2}Al_{y2}Ti_{z1}(PO_4)_3$, $(LiAlTiP)x3Oy_3$-type glass, lithium lanthanum titanium oxide $Li_{x4}La_{y4}TiO_3$, lithium germanium thiophosphate $Li_{x5}Ge_{y5}P_{z2}S_w$, lithium nitride $Li_{x6}N_{y6}$, $SiS_2$-type glass $Li_{x7}Si_{y7}S_{z3}$, and $P_2S_5$-type glass $Li_{x8}P_{y8}S_{z4}$, where 0<x1<2, 0<y1<3, 0<x2<2, 0<y2<1, 0<z1<3, 0<x3<4, 0<y3<13, 0<x4<2, 0<y4<3, 0<x5<4, 0<y5<1, 0<z2<1, 0<w<5, 0<x6<4, 0<y6<2, 0<x7<3, 0<y7<2, 0<z3<4, 0<x8<3, 0<y8<3, 0<z4<7. In this way, the ion transport characteristics of the separator can be further improved.

Optionally, the inorganic particles capable of electrochemical reactions include at least one of lithium-containing transition metal oxides, lithium-containing phosphates, carbon-based materials, silicon-based materials, tin-based materials, and lithium titanium compounds.

The organic particles have the characteristics of good thermal stability and are not easily decomposed, which can improve the heat resistance of the separator. In addition, when the internal temperature of the secondary battery reaches the melting point of the organic particles due to overcharging abuse, thermal abuse, or the like, the organic particles can be melted and be absorbed into the micropores of the substrate by capillary action to play the role of pore sealing and circuit breaking, thereby helping to ensure the high safety performance of the secondary battery.

In some embodiments, the organic particles include but are not limited to at least one of polyethylene particles, polypropylene particles, polystyrene particles, melamine resin particles, phenolic resin particles, polyester particles (for example, polyethylene terephthalate, polyethylene naphthalate, polybutylene terephthalate), polyimide particles, polyamide-imide particles, polyaramid particles, polyphenylene sulfide particles, polysulfone particles, polyether sulfone particles, polyether ether ketone particles, polyarylether ketone particles, and copolymers of butyl acrylate and ethyl methacrylate (for example, crosslinked polymers of butyl acrylate and ethyl methacrylate).

In some embodiments, optionally, the glass transition temperature of the organic particles can be above 130° C. Thus, when the internal temperature of the secondary battery reaches 130° C., the organic particles will not transition from a glassy state to a viscous flow state, thereby ensuring that the separator does not shrink drastically. More optionally, the organic particles include but are not limited to at least one of melamine-formaldehyde resin particles, phenolic resin particles, polyester particles, polyimide particles, polyamide-imide particles, polyaramid particles, polyphenylene sulfide particles, polysulfone particles, polyether sulfone particles, polyether ether ketone particles, and polyarylether ketone particles.

In some embodiments, the coating layer may further include a binder. This application does not impose special restrictions on the type of binder, and any known material with good adhesion can be selected. In an example, the binder includes at least one of water-soluble acrylic resin (for example, homopolymers or copolymers of acrylic acid, methacrylic acid, sodium acrylate monomer), polyvinyl alcohol, isobutylene-maleic anhydride copolymer, and polyacrylamide.

Optionally, a percentage of the binder in the coating layer is <30% based on a mass of the coating layer.

In some embodiments, the separator may further include an adhesion layer, where the adhesion layer is disposed on at least a part of the surface of the coating layer, and the adhesion layer includes a binder. The adhesion layer can not only prevent the coating layer from falling off and improve the safety performance of the secondary battery, but also improve the interface between the separator and the electrode and improve the cycling performance of the secondary battery.

Optionally, the binder includes at least one of homopolymer or copolymer of acrylate monomer, homopolymer or copolymer of acrylic monomer, and homopolymer or copolymer of fluorine-containing olefin monomer. The comonomer includes but is not limited to at least one of acrylate monomer, acrylic monomer, olefin monomer, halogen-containing olefin monomer, and fluoroether monomer.

Optionally, the binder includes a vinylidene fluoride-based polymer, for example, a homopolymer of vinylidene fluoride (VDF) monomer and/or a copolymer of vinylidene fluoride monomer with another comonomer. The another comonomer may be at least one of olefin monomer, fluorine-containing olefin monomer, chlorine-containing olefin monomer, acrylate monomer, acrylic monomer, and fluoroether monomer. Optionally, the another comonomer may include at least one of trifluoroethylene (VF3), chlorotrifluoroethylene (CTFE), 1,2-difluoroethylene, tetrafluoroethylene (TFE), hexafluoropropylene (HFP), perfluoro(alkyl vinyl ether) (for example, perfluoro(methyl vinyl ether) PMVE, perfluoro(ethyl vinyl ether) PEVE, perfluoro(propyl vinyl ether) PPVE), perfluoro(1,3-dioxole), and perfluoro(2,2-dimethyl-1,3-dioxole) (PDD).

In some embodiments, the separator has a machine direction thermal shrinkage rate $\eta_1 \leq 5.0\%$ at 150° C. for 1 h, and optionally, $0.5\% \leq \eta_1 \leq 3\%$.

In some embodiments, the separator has a transverse direction thermal shrinkage rate $\eta_2 \leq 5.0\%$ at 150° C. for 1 h, and optionally, $0.5\% \leq \eta_2 \leq 2\%$.

The separator of this application has low thermal shrinkage rates in both the machine direction and the transverse direction at high temperatures of 150° C., thereby further improving the safety performance of the secondary battery.

In some embodiments, the separator has a machine direction tensile strength $R_{m1} \geq 3000$ kg/cm$^2$, and optionally, 3500 kg/cm$^2 \leq R_{m1} \leq 4500$ kg/cm$^2$.

In some embodiments, the separator has a transverse direction tensile strength $R_{m2} \geq 3000$ kg/cm$^2$, and optionally, 3500 kg/cm$^2 \leq R_{m2} \leq 4500$ kg/cm$^2$.

The separator in this application has high tensile strength in both the transverse direction and the machine direction, allowing for a low probability of damage to the separator when the secondary battery swells, thereby improving the safety performance of the secondary battery.

In some embodiments, the separator has an air permeability MAP≤250 s/100 mL, and optionally, 120 s/100 mL≤MAP≤180 s/100 mL. The separator of this application has good air permeability, thereby improving ion transport characteristics.

In some embodiments, the separator has a wetted length L≥30 mm, and optionally, 30 mm≤L≤80 mm.

In some embodiments, the separator has a wetted velocity u≥3 mm/s, and optionally, 3 mm/s≤u≤10 mm/s.

The separator of this application has good electrolyte infiltration characteristics, thereby improving ion transport characteristics and the capacity performance of the secondary battery.

The thermal shrinkage rate, tensile strength, and air permeability of the separator all have meanings well-known in the art, and can be measured using known methods in the art. For example, all of them may be measured in accordance with GB/T 36363-2018.

The wetted length and wetted velocity of the separator have the meanings well-known in the art, and can be measured using known methods in the art. An example test method is as follows: cutting the separator into samples of 5 mm×100 mm in width and length, fixing two ends of the sample and placing the sample horizontally; adding 0.5 mg of an electrolyte dropwise at the center of the sample; and after a specified time (1 min in this application) is reached, taking a photo and measuring the length of electrolyte diffusion, to obtain the wetted length and wetted velocity of the separator. To ensure the accuracy of the test results, multiple (for example, 5 to 10) samples can be tested, and the test results are obtained by calculating an average value. The electrolyte can be prepared in the following method: mixing ethylene carbonate (EC), ethyl methyl carbonate (EMC), and diethyl carbonate (DEC) at a mass ratio of 30:50:20 to produce an organic solvent, and dissolving thoroughly dried $LiPF_6$ in the organic solvent to prepare an electrolyte with a concentration of 1 mol/L.

It should be noted that parameters (for example, surface density and thickness) of the coating layer of the separator mentioned above are all for the coating layer on one side of the substrate. When the coating layer is disposed on two sides of the substrate, the coating layer is considered to fall within the protection scope of this application as long as parameters of the coating layer on either side satisfy this application.

Method for Preparing Separator

According to a fourth aspect, this application further provides a method for preparing a separator. The method can be used to prepare the separator according to any one of embodiments of the third aspect of this application.

The method includes the following steps.

Step S10: Provide a substrate.

Step S20: Prepare a coating slurry: mixing a polymer in an appropriate amount of solvent to prepare the coating slurry according to a predetermined mass.

Step S30: Application: applying the coating slurry to at least one surface of the substrate to form a coating layer and dry it to obtain the separator, where the separator includes the substrate and the coating layer disposed on at least one surface of the substrate.

The polymer in step S20 may be the polymer according to any one of the embodiments of the first aspect of this application, or the polymer prepared by the method according to any one of the embodiments of the second aspect of this application.

In some embodiments, in step S20, the solvent may be water, such as deionized water.

In some embodiments, in step S20, the coating slurry may further include other components, such as a dispersant, a wetting agent, and a binder.

In some embodiments, in step S20, a solid content of the coating slurry can be controlled between 28% and 45%, for example, between 30% and 38%. The solid content of the coating slurry being within the foregoing range can effectively reduce the film surface problems of the coating layer and reduce the probability of uneven coating, thereby further improving the energy density and safety performance of the secondary battery.

In some embodiments, in step S30, the coating is performed using a coater. In this application, the model of the coater is not specially limited, for example, a commercially available coater can be used. The coater includes a gravure roller; where the gravure roller is configured to transfer the coating slurry to the substrate.

In some embodiments, in step S30, the coating method can be transfer coating, rotary spraying, dip coating, or the like.

In some embodiments, the method further includes the following steps:

Step S40: Secondary application: apply a slurry containing a binder to at least part of the surface of the coating layer to form an adhesion layer after drying. Optionally, the coating method is rotary spraying.

According to the preparation method of the separator in this application, the coating layer is obtained through one-time coating, greatly simplifying the production process of the separator.

For some raw materials used in the method for preparing a separator in this application and parameters such as percentages thereof, refer to the separator according to the first aspect of the embodiments of this application. Details are not described herein again.

Unless otherwise specified, all raw materials used in the method for preparing a separator in this application are commercially available.

Secondary Battery

According to a fifth aspect, this application further provides a secondary battery.

The secondary battery, also referred to as a rechargeable battery or a storage battery, is a battery that can be charged after being discharged to activate active materials for continuous use. Typically, a secondary battery includes an electrode assembly and an electrolyte. The electrode assembly includes a positive electrode plate, a negative electrode plate, and a separator. The separator is disposed between the positive electrode plate and the negative electrode plate, mainly to prevent short circuit between the positive electrode and the negative electrode and allow active ions to pass through.

The secondary battery is not limited to any particular type in this application. For example, the secondary battery may be a lithium-ion battery, a sodium-ion battery, or the like, and particularly, the secondary battery may be a lithium-ion secondary battery.

The secondary battery of this application includes the separator according to the third aspect of the embodiments of this application or a separator prepared by using the method according to the fourth aspect of the embodiments of this application, where the separator is sandwiched between the positive electrode plate and the negative electrode plate. Optionally, at least a side of the separator closer to the negative electrode plate has the coating layer of this application. Further, the separator closer to the positive electrode plate has the coating layer of this application, and the separator closer to the negative electrode plate also has the coating layer of this application. In this way, the secondary battery of this application can improve its own safety performance.

[Positive Electrode Plate]

In some embodiments, the positive electrode plate includes a positive electrode current collector and a positive electrode film layer disposed on at least one surface of the positive electrode current collector and including a positive electrode active material. For example, the positive electrode current collector has two opposite surfaces in its thickness direction, and the positive electrode film layer is disposed on either or both of the two opposite surfaces of the positive electrode current collector.

When the secondary battery in this application is a lithium-ion battery, the positive electrode active material may include but is not limited to at least one of lithium-containing transition metal oxide, lithium-containing phosphate, and their respective modified compounds. Examples of the lithium-containing transition metal oxide may include but are not limited to at least one of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and their respective modified compounds. Examples of the lithium-containing phosphate may include but are not limited to at least one of lithium iron phosphate, a composite material of lithium iron phosphate and carbon, lithium manganese phosphate, a composite material of lithium manganese phosphate and carbon, lithium manganese iron phosphate, a composite material of lithium manganese iron phosphate and carbon, and their respective modified compounds.

In some embodiments, to further increase the energy density of the secondary battery, the positive electrode active material for lithium-ion batteries may include at least one of lithium transition metal oxides with a general formula $Li_aNi_bCo_cM_dO_eA_f$ and their modified compounds, where $0.8 \leq a \leq 1.2$, $0.5 \leq b < 1$, $0 < c < 1$, $0 < d < 1$, $1 \leq e \leq 2$, $0 \leq f \leq 1$, M includes at least one of Mn, Al, Zr, Zn, Cu, Cr, Mg, Fe, V, Ti, and B, and A includes at least one of N, F, S, and Cl.

For example, the positive electrode active material for lithium-ion batteries may include at least one of $LiCoO_2$, $LiNiO_2$, $LiMnO_2$, $LiMn_2O_4$, $LiNi_{1/3}Co_{1/3}Mn_{1/3}O_2$ (NCM 333), $LiNi_{0.5}Co_{0.2}Mn_{0.3}O_2$(NCM523), $LiNi_{0.6}Co_{0.2}Mn_{0.2}O_2$(NCM622), $LiNi_{0.8}Co_{0.1}M_{0.1}O_2$(NCM811), $LiNi_{0.85}Co_{0.15}Al_{0.05}O_2$, $LiFePO_4$, and $LiMnPO_4$.

When the secondary battery in this application is a sodium-ion battery, the positive electrode active material may include but is not limited to at least one of sodium-containing transition metal oxide, a polyanionic material (for example, phosphate, fluorophosphate, pyrophosphate, and sulfate), and a Prussian blue material.

For example, the positive electrode active material for sodium-ion batteries may include at least one of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, a Prussian blue material, and a material with a general formula $X_pM'_q(PO_4)_rO_xY_{3-x}$. In the general formula $X_pM'_q(PO_4)_rO_xY_{3-x}$, $0 < p \leq 4$, $0 < q \leq 2$, $1 \leq r \leq 3$. $0 \leq x \leq 2$, X includes at least one of $H^+$, $Li^+$, $Na^+$, $K^+$, and $NH_4^+$, M' is a transition metal cation, and optionally is at least one of V, Ti, Mn, Fe, Co, Ni, Cu, and Zn, and Y is a halogen anion, and optionally is at least one of F, Cl, and Br.

In this application, the modified compounds of the above positive electrode active materials may be modified by doping and/or surface coating on the positive electrode active material.

In some embodiments, the positive electrode film layer further optionally includes a positive electrode conductive agent. The positive electrode conductive agent is not limited to a particular type in this application. For example, the positive electrode conductive agent includes at least one of superconducting carbon, conductive graphite, acetylene black, carbon black, Ketjen black, carbon dots, carbon nanotubes, graphene, and carbon nanofiber. In some embodiments, a mass percentage of the positive electrode conductive agent is ≤5% based on a total mass of the positive electrode film layer.

In some embodiments, the positive electrode film layer further optionally includes a positive electrode binder. The positive electrode binder is not limited to a particular type in this application. For example, the positive electrode binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin. In some embodiments, a mass percentage of the positive electrode binder is ≤5% based on the total mass of the positive electrode film layer.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. For example, the metal material may include at least one of aluminum, aluminum alloy, nickel, nickel alloy, titanium, titanium alloy, silver, and silver alloy. For example, the polymer material matrix may include at least one of polypropylene (PP), polyethylene terephthalate (PET), polybutylene terephthalate (PBT), polystyrene (PS), and polyethylene (PE).

The positive electrode film layer is typically formed by applying a positive electrode slurry onto the positive electrode current collector, followed by drying and cold pressing. The positive electrode slurry is typically formed by dispersing the positive electrode active material, the optional conductive agent, the optional binder, and any other components in a solvent and stirring them to uniformity. The solvent may be N-methylpyrrolidone (NMP), but is not limited thereto.

[Negative Electrode Plate]

In some embodiments, the negative electrode plate includes a negative electrode current collector and a negative electrode film layer disposed on at least one surface of the negative electrode current collector and including a negative electrode active material. For example, the negative electrode current collector has two opposite surfaces in its thickness direction, and the negative electrode film layer is provided on either or both of the two opposite surfaces of the negative electrode current collector.

The negative electrode active material may be a negative electrode active material for secondary batteries well-known in the art. For example, the negative electrode active material may include but is not limited to at least one of natural graphite, artificial graphite, soft carbon, hard carbon, a silicon-based material, a tin-based material, and lithium titanate. The silicon-based material may include at least one of elemental silicon, silicon oxide, silicon-carbon composite, silicon-nitrogen composite, and a silicon alloy material. The tin-based material may include at least one of elemental tin, tin oxide, and a tin alloy material.

In some embodiments, the negative electrode film layer further optionally includes a negative electrode conductive agent. The negative electrode conductive agent is not limited to a particular type in this application. For example, the negative electrode conductive agent may include at least one of superconducting carbon, conductive graphite, acetylene black, carbon black, Ketjen black, carbon dots, carbon nanotubes, graphene, and carbon nanofiber. In some embodiments, a mass percentage of the negative electrode conductive agent is ≤5% based on the total mass of the negative electrode film layer.

In some embodiments, the negative electrode film layer further optionally includes a negative electrode binder. The negative electrode binder is not limited to a particular type in this application. For example, the negative electrode binder may include at least one of styrene-butadiene rubber (SBR), water-soluble unsaturated resin SR-1B, waterborne acrylic resin (for example, polyacrylic acid PAA, polymethylacrylic acid PMAA, and polyacrylic acid sodium PAAS), polyacrylamide (PAM), polyvinyl alcohol (PVA), sodium alginate (SA), and carboxymethyl chitosan (CMCS). In some embodiments, a mass percentage of the negative electrode binder is ≤5% based on the total mass of the negative electrode film layer.

In some embodiments, the negative electrode film layer further optionally includes another additive. For example, the another additive may include a thickener, for example, sodium carboxymethyl cellulose (CMC) or PTC thermistor material. In some embodiments, a mass percentage of the another additive is ≤2% based on the total mass of the negative electrode film layer.

In some embodiments, the negative electrode current collector may be a metal foil current collector or a composite current collector. For example, a copper foil may be used as the metal foil. The composite current collector may include a polymer material matrix and a metal layer formed on at least one surface of the polymer material matrix. For example, the metal material may include at least one of copper, copper alloy, nickel, nickel alloy, titanium, titanium alloy, silver, and silver alloy. For example, the polymer material matrix may include at least one of polypropylene (PP), polyethylene terephthalate (PET), polybutylene terephthalate (PBT), polystyrene (PS), and polyethylene (PE).

The negative electrode film layer is typically formed by applying a negative electrode slurry onto the negative electrode current collector, followed by drying and cold pressing. The negative electrode slurry is typically formed by dispersing the negative electrode active material, the optional conductive agent, the optional binder, and the optional other additives in a solvent and stirring them to uniformity. The solvent may be but is not limited to N-methylpyrrolidone (NMP) or deionized water.

The negative electrode plate does not exclude additional functional layers other than the negative electrode film layer. For example, in some embodiments, the negative electrode plate described in this application further includes a conductive primer layer (for example, consisting of a conductive agent and a binder) disposed on the surface of the negative electrode current collector and sandwiched between the negative electrode current collector and the negative electrode film layer. In some other embodiments, the negative electrode plate of this application further includes a protection layer covering the surface of the negative electrode film layer.

[Electrolyte]

In a charge and discharge process of the secondary battery, active ions intercalate and deintercalate between the positive electrode plate and the negative electrode plate. The electrolyte is between the positive electrode plate and the negative electrode plate to mainly conduct active ions. The electrolyte is not specifically limited to any particular type in this application, and may be selected depending on actual needs.

The electrolyte includes an electrolytic salt and a solvent. The electrolytic salt and solvent are not specifically limited to any types, and may be selected depending on actual needs.

When the secondary battery in this application is a lithium-ion battery, for example, the electrolytic salt may include but is not limited to at least one of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bistrifluoromethanesulfonimide (LiTFSI), lithium trifluoromethanesulfonate (LiTFS), lithium difluoro(oxalato)borate (LiDFOB), lithium dioxalate borate (LiBOB), lithium difluorophosphate ($LiPO_2F_2$), lithium difluoro(dioxalato) phosphate (LiDFOP), and lithium tetrafluoro oxalato phosphate (LiTFOP).

When the secondary battery in this application is a sodium-ion battery, for example, the electrolytic salt may include but is not limited to at least one of sodium hexafluorophosphate ($NaPF_6$), sodium tetrafluoroborate ($NaBF_4$), sodium perchlorate ($NaClO_4$), sodium hexafluoroarsenate ($NaAsF_6$), sodium bis(fluorosulfonyl)imide (NaFSI), sodium bistrifluoromethanesulfonimide (NaTFSI), sodium trifluoromethanesulfonate (NaTFS), sodium difluoro(oxalato)borate (NaDFOB), sodium dioxalate borate (NaBOB), sodium difluorophosphate ($NaPO_2F_2$), sodium difluoro(dioxalato)phosphate (NaDFOP), and sodium tetrafluoro oxalato phosphate (NaTFOP).

For example, the solvent may include but is not limited to at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-gamma-butyrolactone (GBL), sulfolane (SF), methyl sulfonyl methane (MSM), ethyl methyl sulfone (EMS), and diethyl sulfone (ESE).

In some embodiments, the electrolyte further optionally includes an additive. For example, the additive may include a negative electrode film-forming additive, or may include a positive electrode film-forming additive, or may include an additive capable of improving some performance of the battery, for example, an additive for improving overcharge performance of the battery, an additive for improving high-temperature performance of the battery, or an additive for improving low-temperature power performance of the battery.

In some embodiments, the positive electrode plate, the separator, and the negative electrode plate may be made into an electrode assembly through winding and/or lamination.

In some embodiments, the secondary battery may include an outer package. The outer package may be used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic, for example, at least one of polypropylene (PP), polybutylene terephthalate (PBT), and polybutylene succinate (PBS).

This application does not impose any special limitations on a shape of the secondary battery, and the secondary battery may be cylindrical, rectangular, or of any other shapes. FIG. 1 shows a secondary battery 5 of a rectangular structure as an example.

Figure 2:
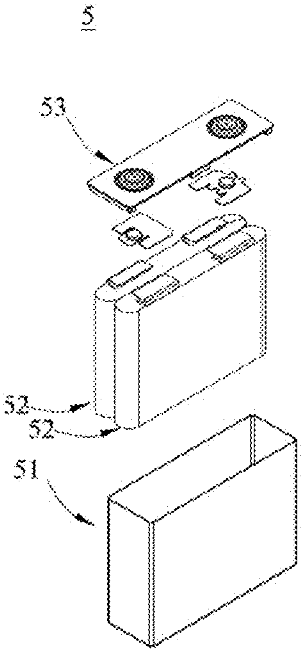
FIG. 2 is a schematic exploded view of the embodiment of the secondary battery in FIG. 1.

In some embodiments, as shown in FIG. 2, the outer package may include a housing 51 and a cover plate 53. The housing 51 may include a base plate and side plates connected to the base plate, and the base plate and the side plates enclose an accommodating cavity. The housing 51 has an opening communicating with the accommodating cavity, and the cover plate 53 is configured to cover the opening to close the accommodating cavity. The positive electrode plate, the negative electrode plate, and the separator may be made into an electrode assembly 52 through winding and/or lamination. The electrode assembly 52 is packaged in the accommodating cavity. The electrolyte infiltrates the electrode assembly 52. The secondary battery 5 may include one or more electrode assemblies 52 whose quantity is adjustable as required.

The preparation method of secondary battery of this application is well known. In some embodiments, the positive electrode plate, the separator, the negative electrode plate, and the electrolyte may be assembled to form a secondary battery. For example, the positive electrode plate, the separator, and the negative electrode plate may be made into an electrode assembly through winding and/or lamination; and the electrode assembly is put in an outer package which is filled with electrolyte after drying, followed by processes such as vacuum packaging, standing, formation, and shaping, to obtain a secondary battery.

In some embodiments of this application, such secondary batteries of this application may be assembled into a battery module. The battery module may include a plurality of secondary batteries, and a specific quantity may be adjusted based on application and capacity of the battery module.

Figure 3:
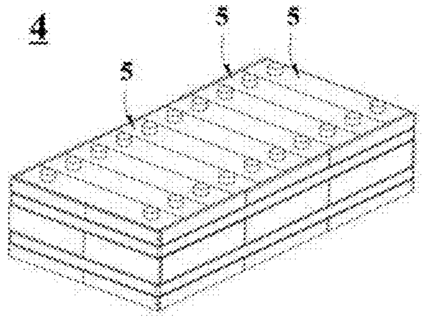
FIG. 3 is a schematic diagram of an embodiment of a battery module in this application.

FIG. 3 is a schematic diagram of a battery module 4 as an example. As shown in FIG. 3, in the battery module 4, a plurality of secondary batteries 5 may be sequentially arranged along a length direction of the battery module 4. Certainly, the batteries may alternatively be arranged in any other manners. Further, the plurality of secondary batteries 5 may be fastened by using fasteners.

Optionally, the battery module 4 may further include a housing with an accommodating space, and the plurality of secondary batteries 5 are accommodated in the accommodating space.

In some embodiments, the battery modules may be further assembled into a battery pack, and a quantity of battery modules included in the battery pack may be adjusted based on application and capacity of the battery pack.

Figure 4:
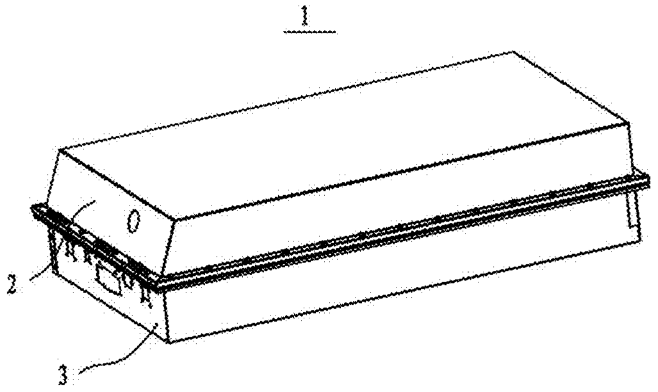
FIG. 4 is a schematic diagram of an embodiment of a battery pack in this application.
Figure 5:
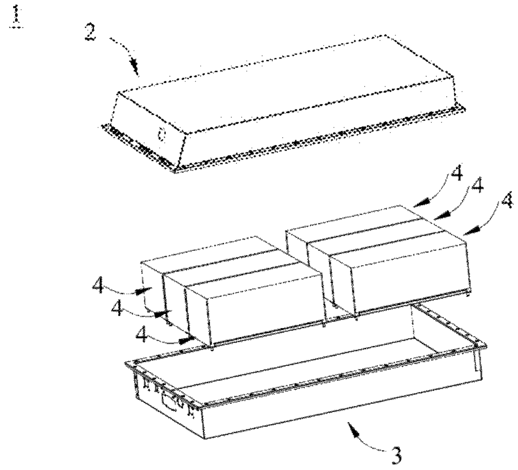
FIG. 5 is a schematic exploded view of the embodiment of the battery pack shown in FIG. 4.

FIG. 4 and FIG. 5 are schematic diagrams of a battery pack 1 as an example. As shown in FIG. 4 and FIG. 5, the battery pack 1 may include a battery box and a plurality of battery modules 4 arranged in the battery box. The battery box includes an upper box body 2 and a lower box body 3. The upper box body 2 is configured to be engaged with the lower box body 3 to form an enclosed space for accommodating the battery modules 4. The plurality of battery modules 4 may be arranged in the battery box in any manner.

Electric Apparatus

According to a sixth aspect, an embodiment of this application provides an electric apparatus. The electric apparatus includes at least one of the secondary battery, battery module, or battery pack according to this application. The secondary battery, battery module, or battery pack may be used as a power source for the electric apparatus or may be used as an energy storage unit of the electric apparatus. The electric apparatus may include but is not limited to a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, or an energy storage system.

The secondary battery, the battery module, or the battery pack may be selected for the electric apparatus based on requirements for using the electric apparatus.

Figure 6:
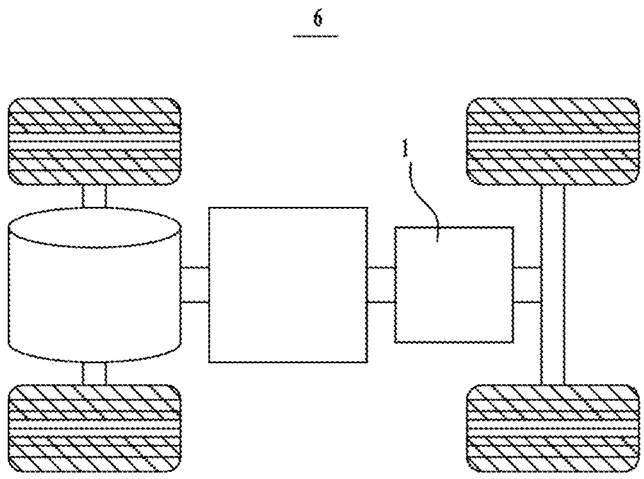
FIG. 6 is a schematic diagram of an embodiment of an electric apparatus including the secondary battery in this application as a power source.

FIG. 6 is a schematic diagram of an electric apparatus as an example. This electric apparatus is a battery electric vehicle, a hybrid electric vehicle, a plug-in hybrid electric vehicle, or the like. To satisfy requirements of the electric apparatus for high power and high energy density, a battery pack or a battery module may be used.

In another example, the electric apparatus may be a mobile phone, a tablet computer, a notebook computer, or the like. Such electric apparatus is generally required to be light and thin and may use a secondary battery as its power source.

EXAMPLES

Examples below more specifically describe the content disclosed in this application, and these embodiments are merely used for explanatory description. It is apparent for persons skilled in the art to make various modifications and variations within the scope of the content disclosed in this application. Unless otherwise stated, all parts, percentages, and ratios reported in the following examples are based on mass, all reagents used in the examples are commercially available or synthesized in a conventional manner, and can be used directly without further treatment, and all instruments used in the examples are commercially available.

Preparation of Polymer

Example A

Preparation of Prepolymer 1400 g of deionized water and 7 g of sodium dodecyl sulfate were separately added to a 5 L three-necked flask, and emulsified at a stirring speed of 1500 r/min for 30 min to produce a uniform and stable emulsion. Then, 645.68 g of methyl acrylate, 79.59 g of acrylonitrile, and 663.50 g of methacryloxypropyl cage-type polysilsesquioxane (a molar percentage ratio of methyl acrylate, acrylonitrile, and methacryloxypropyl cage-type polysilsesquioxane was 15:3:2) were sequentially added, and the resulting mixture was stirred at a speed of 1500 r/min for 30 min to produce a uniform prepolymer.

Preparation of Polymer

In a dry three-necked flask, 3 g of emulsifier and 1000 g of deionized water were added, and emulsified at high speed for 30 min to produce a uniform and stable emulsion. Then, the prepolymer prepared in the previous step and an initiator solution (which was produced by dissolving 3 g of the initiator potassium persulfate in 30 g of deionized water) were slowly added dropwise using a peristaltic pump. After the dropwise addition was completed, the resulting solution was heated to 90° C., kept at this temperature for reaction for 0.5 h, and cooled to 40° C., with the pH adjusted to 7 to 8 with ammonia water, followed by filtering, discharging, and drying, to prepare a polymer.

Examples B to E

Polymers were prepared using a method similar to that in Example A, except that at least one of the raw material components and contents was adjusted.

Relevant parameters for the preparation of polymers are shown in Tables 1A, 1B, 1C and 2.

Example 1

Preparation of Separator

Provision of PE substrate: thickness of 7 m, porosity of 40%, ion conductivity of 1.20 mS/cm.

Preparation of coating slurry: the polymer prepared in Example A and a water-soluble acrylic binder were mixed uniformly in an appropriate amount of a solvent deionized water at a mass ratio of 90:10 to obtain a coating slurry.

Application: the prepared coating slurry was applied to both surfaces of the PE substrate using a coater, and a separator was obtained through processes such as drying and slitting. The coating layer on one side of the PE substrate had a surface density of 0.9 g/m$^2$ and a thickness of 0.45 μm.

Preparation of Positive Electrode Plate

A positive electrode active material $LiNi_{0.8}Co_{0.1}Mn_{0.1}O_2$ (NCM811), a conductive agent carbon black (Super P), and a binder polyvinylidene fluoride (PVDF) were evenly mixed at a mass ratio of 96.2:2.7:1.1 in an appropriate amount of solvent N-methylpyrrolidone (NMP) to obtain a positive electrode slurry. The positive electrode slurry was applied onto a positive electrode current collector aluminum foil, the aluminum foil coated with the positive electrode slurry was subject to processes such as drying, cold pressing, slitting, and cutting, and a positive electrode plate was obtained. The positive electrode plate had a surface density of 0.207 $mg/mm^2$ and a compacted density of 3.5 $g/cm^3$.

Preparation of Negative Electrode Plate

A negative electrode active material artificial graphite, a conductive agent carbon black (Super P), a binder styrene-butadiene rubber (SBR), and sodium carboxymethyl cellulose (CMC) were evenly mixed at a mass ratio of 96.4:0.7:1.8:1.1 in an appropriate amount of solvent deionized water to obtain a negative electrode slurry. The negative electrode slurry was applied onto a negative electrode current collector copper foil, the copper foil coated with the negative electrode slurry was subject to processes such as drying, cold pressing, and slitting, and a negative electrode plate was obtained. The negative electrode plate has a surface density of 0.126 $mg/mm^2$ and a compacted density of 1.7 $g/cm^3$.

Preparation of Electrolyte

Ethylene carbonate (EC) and ethyl methyl carbonate (EMC) were mixed at a mass ratio of 30:70 to obtain an organic solvent. Then, fully dried $LiPF_6$ was dissolved in the organic solvent to prepare an electrolyte with a concentration of 1 mol/L.

Preparation of Secondary Battery

The positive electrode plate, the separator, and the negative electrode plate were sequentially stacked and wound to obtain an electrode assembly. The electrode assembly was placed into an outer package and dried. Then the outer package with the electrode assembly therein was injected with the electrolyte, followed by processes such as vacuum packaging, standing, formation, and shaping, and a secondary battery was obtained.

Comparative Examples, and Examples 2 to 15

Secondary batteries were prepared using a method similar to that in Example 1, with differences in the preparation parameters of the separator. Detailed parameters are given in Table 3.

Example 16

A secondary battery was prepared using a method similar to that in Example 1, with differences in the preparation method of the coating slurry, specifically: the polymer prepared in Example A, a filler aluminum oxide (with an average particle size $D_v50$ of 300 nm), and a binder aqueous solution polyacrylic acid were evenly mixed at a mass ratio of 80:15:5 in an appropriate amount of solvent deionized water to produce a coating slurry with a solid content of 35 wt %.

Tests

1. Test for Adhesion Between Separator and Positive Electrode Plate

A positive electrode plate and separator of a battery were stacked and placed on a hot pressing machine, where parameters of the hot pressing machine were set as follows: temperature was 25° C., pressure was 10 ton, and time was 30s. A sample of adhered separator/positive electrode plate was obtained under the action of pressure. The sample of adhered separator/electrode plate was cut into rectangular sample strips of 150 mm×20 mm. The positive electrode plate side of the rectangular sample strip was attached to a steel plate with a double-sided tape, and the separator was separated from the positive electrode plate by 2 cm along a length direction at one end of the rectangular sample strip to obtain a test specimen.

The steel plate was kept horizontal and fixed with a lower clamp of a universal testing machine (Model CTM2100 from Xie Qiang Instrument Manufacturing (Shanghai) Co., Ltd.), and the peeled end of the separator was fixed with an upper clamp of the universal testing machine and connected to a tensile machine. The test conditions were set to a stretching speed of 20 mm/min and a horizontal pull of 10 cm. After the tension became stable, the tension value was recorded, and the adhesion between the separator and the electrode plate was obtained based on a ratio of the tension value to the width of the sample.

2. Test for Thermal Shrinkage Rate of Separator

Sample preparation: The separator prepared above was die-cut with a punching machine into samples of 50 mm×100 mm in width and length, 5 samples were placed in parallel on an A4 paper, and then the A4 paper with the samples was placed on corrugated paper with a thickness of 1 mm to 5 mm.

Sample testing: The temperature of the forced air oven was set to 150° C., and after the temperature reached the set temperature and stabilized for 30 min, the A4 paper placed on the corrugated paper was placed into the forced air oven, and timing was started. After the set time (1 h in this application) was reached, the length and width of the separator were measured, and the values were marked as a and b, respectively.

Calculation of thermal shrinkage rate: the thermal shrinkage rate in the machine direction (MD)=[(100−a)/100]×100%, the thermal shrinkage rate in the transverse direction (TD)=[(50−b)/50]×100%, and an average value of 5 parallel samples was taken as the test result.

3. Hot Box Test for Secondary Battery

At 25° C., the secondary battery was charged at a constant current of 1 C to 4.2 V, and then charged at a constant voltage until the current was ≤0.05 C, and left standing for 5 min. Then the secondary battery was tested with a fixture in a DHG-9070A DHG series high-temperature oven, the temperature was raised from room temperature to 80±2° C. at a rate of 5° C./min, and maintained for 30 min. Then the temperature was raised at a rate of 5° C./min, and maintained for 30 min for every 5° C. increase until the secondary battery failed. During the temperature increase process, the surface temperature change of the secondary battery was monitored. When the temperature started to rise sharply, the corresponding oven temperature was the hot-box failure temperature of the secondary battery. Higher hot-box failure temperature of the secondary battery indicates better thermal safety performance of the secondary battery.

TABLE 1A

| No. | First monomer Type | First structural unit Molar percentage A % | Second monomer Type |
|---|---|---|---|
| Example A | Methyl acrylate | 75.0 | Acrylonitrile |
| Comparative example M-1 | Methyl acrylate | 80.0 | Acrylonitrile |
| Comparative example M-2 | Methyl acrylate | 80.0 | / |
| Example B-1 | Ethyl acrylate | 75.0 | Acrylonitrile |
| Example B-2 | N-butyl acrylate | 75.0 | Acrylonitrile |
| Example B-3 | Methyl acrylate | 75.0 | Methacrylonitrile |
| Example B-4 | Methyl acrylate | 75.0 | Acrylonitrile |
| Example B-5 | Methyl acrylate | 75.0 | Acrylonitrile |

TABLE 1A-continued

| No. | First monomer Type | First structural unit Molar percentage A % | Second monomer Type |
|---|---|---|---|
| Example C-1 | Methyl acrylate | 80.0 | Acrylonitrile |
| Example C-2 | Methyl acrylate | 80.0 | Acrylonitrile |
| Example C-3 | Methyl acrylate | 60.0 | Acrylonitrile |
| Example C-4 | Methyl acrylate | 50.0 | Acrylonitrile |

TABLE 1B

| No. | Second structural unit Molar percentage B % | Third monomer Type | Third structural unit Molar percentage C % |
|---|---|---|---|
| Example A | 15.0 | Methacryloxypropyl cage-type polysilsesquioxane | 10.0 |
| Comparative example M-1 | 20.0 | / | / |
| Comparative example M-2 | / | Methacryloxypropyl cage-type polysilsesquioxane | 20.0 |
| Example B-1 | 15.0 | Methacryloxypropyl cage-type polysilsesquioxane | 10.0 |
| Example B-2 | 15.0 | Methacryloxypropyl cage-type polysilsesquioxane | 10.0 |
| Example B-3 | 15.00 | Methacryloxypropyl cage-type polysilsesquioxane | 10.0 |
| Example B-4 | 15.0 | Acryloxypropyl cage-type polysilsesquioxane | 10.0 |
| Example B-5 | 15.0 | Methacryloxypropyl hepta-octyl polysilsesquioxane | 10.0 |
| Example C-1 | 5.0 | Methacryloxypropyl cage-type polysilsesquioxane | 15.0 |
| Example C-2 | 15.0 | Methacryloxypropyl cage-type polysilsesquioxane | 5.0 |

TABLE 1B-continued

| No. | Second structural unit Molar percentage B % | Third monomer Type | Third structural unit Molar percentage C % |
|---|---|---|---|
| Example C-3 | 20.0 | Methacryloxypropyl cage-type polysilsesquioxane | 20.0 |
| Example C-4 | 25.0 | Methacryloxypropyl cage-type polysilsesquioxane | 25.0 |

TABLE 1C

| No. | A/B | A/C | A:B:C | Number-average molar mass of polymer |
|---|---|---|---|---|
| Example A | 5 | 7.5 | 15:3:2 | 43676 |
| Comparative example M-1 | 4 | / | 4:1:0 | 24356 |
| Comparative example M-2 | / | 4 | 4:0:1 | 53670 |
| Example B-1 | 5 | 7.5 | 15:3:2 | 46853 |
| Example B-2 | 5 | 7.5 | 15:3:2 | 47751 |
| Example B-3 | 5 | 7.5 | 15:3:2 | 46589 |
| Example B-4 | 5 | 7.5 | 15:3:2 | 39529 |
| Example B-5 | 5 | 7.5 | 15:3:2 | 32652 |
| Example C-1 | 16 | 5.3 | 16:1:3 | 52763 |
| Example C-2 | 5.3 | 16 | 16:3:1 | 25473 |
| Example C-3 | 3 | 3 | 3:1:1 | 65327 |
| Example C-4 | 2 | 2 | 2:1:1 | 78562 |

TABLE 2

| No. | Polymer particles $D_v50$ (μm) | BET specific surface area ($m^2/g$) |
|---|---|---|
| Example A | 1 | 9 |
| Example E-1 | 0.1 | 12 |
| Example E-2 | 2 | 5 |
| Example E-3 | 2.5 | 3 |

TABLE 3

| No. | Separator Type of polymer | Inorganic particles | Mass percentage of polymer (%) | Thermal shrinkage rate (%) MD | TD | Adhesive strength (N/m) | Secondary battery Hot-box failure temperature (° C.) |
|---|---|---|---|---|---|---|---|
| Comparative example 1 | Comparative example M-1 | / | 90.0 | 7.5 | 7.5 | 5.64 | 120 |
| Comparative example 2 | Comparative example M-2 | / | 90.0 | 6.9 | 6.9 | 1.41 | 125 |
| Example 1 | Example A | / | 90.0 | 1.2 | 1.1 | 6.57 | 160 |
| Example 2 | Example B-1 | / | 90.0 | 1.5 | 1.6 | 6.45 | 160 |
| Example 3 | Example B-2 | / | 90.0 | 1.8 | 1.9 | 6.52 | 160 |
| Example 4 | Example B-3 | / | 90.0 | 1.6 | 1.6 | 6.28 | 160 |
| Example 5 | Example B-4 | / | 90.0 | 1.8 | 1.8 | 6.22 | 160 |
| Example 6 | Example B-5 | / | 90.0 | 2.6 | 2.6 | 5.46 | 150 |
| Example 7 | Example C-1 | / | 90.0 | 2.7 | 2.7 | 5.12 | 145 |
| Example 8 | Example C-2 | / | 90.0 | 2.9 | 2.9 | 6.46 | 145 |
| Example 9 | Example C-3 | / | 90.0 | 2.0 | 2.0 | 4.61 | 145 |
| Example 10 | Example C-4 | / | 90.0 | 6.6 | 6.6 | 2.12 | 135 |
| Example 11 | Example E-1 | / | 90.0 | 1.8 | 1.8 | 5.25 | 160 |
| Example 12 | Example E-2 | / | 90.0 | 2.9 | 2.9 | 6.03 | 135 |
| Example 13 | Example E-3 | / | 90.0 | 6.8 | 6.8 | 3.26 | 130 |
| Example 14 | Example A | / | 95.0 | 2.6 | 2.6 | 6.35 | 155 |
| Example 15 | Example A | / | 70.0 | 4.9 | 4.9 | 2.66 | 130 |

TABLE 3-continued

| | Separator | | | | | | |
|---|---|---|---|---|---|---|---|
| No. | Type of polymer | Inorganic particles | Mass percentage of polymer (%) | Thermal shrinkage rate (%) MD | TD | Adhesive strength (N/m) | Secondary battery Hot-box failure temperature (° C.) |
| Example 16 | Example A | Filler<br>aluminium oxide | 80.0<br>14.0 | 2.7 | 2.7 | 4.09 | 155 |

As can be seen from Tables 1 to 3, the polymer in Comparative example 1 includes the first structural unit and the second structural unit. When the separator uses this polymer, it has good adhesion performance, but the hot-box failure temperature of the secondary battery is low, and thermal runaway is likely to occur. The polymer in Comparative example 2 includes the first structural unit and the third structural unit. When the separator uses this polymer, its heat resistance is improved to some extent, but the adhesion performance of the separator is relatively poor.

However, the polymer in Examples 1 to 16 includes the first structural unit, the second structural unit, and the third structural unit, which can improve the heat resistance, adhesion performance, and swelling resistance of the polymer. Adjusting the molar percentages of the three structural units can regulate the performance of the polymer to some extent, especially when $3 \leq A/B \leq 16$, $3 \leq A/C \leq 16$, and/or A:B:C is (12 to 16):(1 to 4):(1 to 4), the performance of the polymer can be further improved. In Examples 15 to 17, the polymer has good heat resistance, and when its content is relatively high, the heat resistance of the separator is better. Inorganic particles such as aluminum oxide can also be used as heat-resistant auxiliary materials to further improve the heat resistance of the separator.

Although this application has been described with reference to the preferred embodiments, various modifications to this application and replacements of the components therein with equivalents can be made without departing from the scope of this application. In particular, as long as there is no structural conflict, the various technical features mentioned in the implementations can be combined in any manner. This application is not limited to the specific embodiments disclosed in this specification but includes all technical solutions falling within the scope of the claims.

The invention claimed is:

1. Polymer granules comprising a first structural unit, a second structural unit, and a third structural unit, wherein the first structural unit comprises a structural unit represented by formula (I):

formula (I)

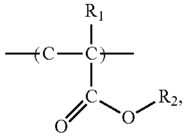

wherein in formula (I), $R_1$ comprises one or more of hydrogen atom and substituted or unsubstituted C1-C5 alkyl; and $R_2$ comprises one or more of substituted or unsubstituted C1-C20 alkyl, substituted or unsubstituted C3-C20 cycloalkyl, and substituted or unsubstituted C1-C20 hydroxyalkyl;

the second structural unit comprises a structural unit represented by formula (II):

formula (II)

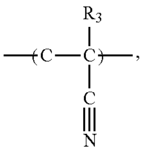

wherein in formula (II), $R_3$ comprises one or more of hydrogen atom and substituted or unsubstituted C1-C5 alkyl; and the third structural unit comprises a structural unit represented by formula (III):

formula (III)

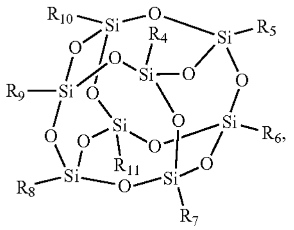

wherein in formula (III), $R_4$ to $R_{11}$ each independently comprise a substituted or unsubstituted C1-C10 alkyl, or a structural unit represented by formula (III-1), with the proviso at least one of $R_4$ to $R_{11}$ comprises the structural unit represented by formula (III-1):

formula (III-1)

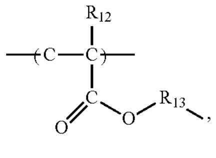

wherein in formula (III-1), $R_{12}$ comprises one or more of hydrogen atom and substituted or unsubstituted C1-C5 alkyl; and $R_{13}$ comprises substituted or unsubstituted C1-C10 alkyl, wherein a volume distribution particle size $D_v50$ of the polymer granules satisfies $0.1\ \mu m \leq D_v50 \leq 2.0\ \mu m$.

2. The polymer granules according to claim 1, wherein $R_1$ comprises hydrogen atom or methyl; and/or $R_2$ comprises methyl, ethyl, n-propyl, isopropyl, n-butyl, sec-butyl, tert-butyl, n-pentyl, n-octyl, isooctyl, 2-ethylhexyl, dodecyl, or isobornyl.

3. The polymer granules according to claim 1, wherein $R_3$ comprises hydrogen atom or methyl.

4. The polymer granules according to claim 1, wherein $R_4$ to $R_{11}$ each independently comprise the structural unit represented by formula (III-1); $R_{12}$ comprises hydrogen atom, methyl, ethyl, n-propyl, isopropyl, n-butyl, sec-butyl, tert-butyl, or n-pentyl; and/or $R_{13}$ comprises n-propyl, isopropyl, n-butyl, sec-butyl, tert-butyl, n-pentyl, n-octyl, isooctyl, or 2-ethylhexyl; or one of $R_4$ to $R_{11}$ comprises the structural unit represented by formula (III-1); $R_{12}$ comprises hydrogen atom, methyl, ethyl, n-propyl, isopropyl, n-butyl, sec-butyl, tert-butyl, or n-pentyl; and/or $R_{13}$ comprises n-propyl, isopropyl, n-butyl, sec-butyl, tert-butyl, n-pentyl, n-octyl, isooctyl, or 2-ethylhexyl.

5. The polymer granules according to claim 1, wherein based on a total number of moles of the first structural unit, the second structural unit, and the third structural unit, a molar percentage of the first structural unit is denoted as A %, wherein $60 \leq A < 100$;

based on the total number of moles of the first structural unit, the second structural unit, and the third structural unit, a molar percentage of the second structural unit is denoted as B %, wherein $0 < B \leq 20$; and/or based on the total number of moles of the first structural unit, the second structural unit, and the third structural unit, a molar percentage of the third structural unit is denoted as C %, wherein $0 < C \leq 20$.

6. The polymer granules according to claim 1, wherein based on the total number of moles of the first structural unit, the second structural unit, and the third structural unit, the molar percentage of the first structural unit is denoted as A %, the molar percentage of the second structural unit is denoted as B %, and the molar percentage of the third structural unit is denoted as C %; and the polymer satisfies one or more of conditions (1) to (3):

(1) $3 \leq A/B \leq 16$;

(2) $3 \leq A/C \leq 16$; and (3) A:B:C being (12 to 16): (1 to 4): (1 to 4).

7. The polymer granules according to claim 1, wherein a number-average molar molecular weight of the polymer is 20000 to 80000.

8. The polymer granules according to claim 1 further satisfying one or more of conditions (I) and (II):

(I) the polymer has a spherical and/or spheroidal morphology;

(II) a specific surface area of the polymer is denoted as S, in $m^2/g$, wherein $5.0 \leq S \leq 12.0$.

9. A method for preparing polymer granules, comprising:

providing a first monomer, a second monomer, and a third monomer; and mixing the first monomer, the second monomer, and the third monomer, and polymerizing them under the action of an initiator to produce the polymer;

wherein the first monomer comprises a compound represented by formula (IV):

formula (IV)

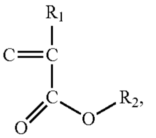

wherein in formula (IV), $R_1$ comprises one or more of hydrogen atom and substituted or unsubstituted C1-C5 alkyl; and $R_2$ comprises one or more of substituted or unsubstituted C1-C20 alkyl, substituted or unsubstituted C3-C20 cycloalkyl, and substituted or unsubstituted C1-C20 hydroxyalkyl;

the second monomer comprises a compound represented by formula (V):

formula (V)

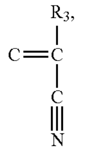

wherein in formula (V), $R_3$ comprises one or more of hydrogen atom and substituted or unsubstituted C1-C5 alkyl; and the third monomer comprises a compound represented by formula (VI):

formula (VI)

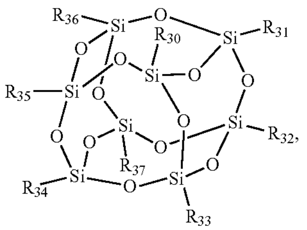

wherein in formula (VI), $R_{30}$ to $R_{37}$ each independently comprise a substituted or unsubstituted C1-C10 alkyl, or a structural unit represented by formula (VI-1), with the proviso that at least one of $R_{30}$ to $R_{37}$ comprises the structural unit represented by formula (VI-1):

formula (VI-1)

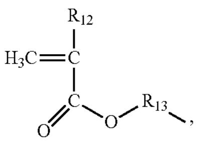

wherein in formula (VI-1), $R_{12}$ comprises one or more of hydrogen atom and substituted or unsubstituted C1-C5 alkyl; and $R_{13}$ comprises substituted or unsubstituted C1-C10 alkyl wherein a volume distribution particle size $D_v50$ of the polymer granules satisfies $0.1\ \mu m \leq D_v50 \leq 2.0\ \mu m$.

10. The method according to claim 9, wherein the step of mixing the first monomer, the second monomer, and the third monomer, and polymerizing them under the action of an initiator to produce the polymer comprises:

adding the first monomer, the second monomer, and the third monomer into a solvent and an emulsifier and mixing them to produce a mixed system; and adding the initiator into the mixed system, and polymerizing them under the action of the initiator to produce the polymer.

11. The method according to claim 9, wherein the first monomer comprises one or more of a compound selected from the group consisting of methyl acrylate, ethyl acrylate, n-propyl acrylate, isopropyl acrylate, n-butyl acrylate, isobutyl acrylate, sec-butyl acrylate, tert-butyl acrylate, n-pentyl acrylate, n-octyl acrylate, isooctyl acrylate, 2-ethylhexyl acrylate, cyclohexyl acrylate, lauryl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, and 2-hydroxypropyl methacrylate;

the second monomer comprises acrylonitrile and/or methacrylonitrile; and/or the third monomer comprises one or more of a compound selected from the group consisting of methacryloxypropyl cage-type polysilsesquioxane, methacryloxypropyl hepta-isobutyl polysilsesquioxane, methacryloxypropyl hepta-octyl polysilsesquioxane, acryloxypropyl cage-type polysilsesquioxane, acryloxypropyl hepta-isobutyl polysilsesquioxane, and methacryloxypropyl hepta-octyl polysilsesquioxane.

12. A separator, comprising a substrate and a coating layer disposed on at least one surface of the substrate, wherein the coating layer comprises the polymer granules according to claim 1.

13. The separator according to claim 12, wherein based on a mass of the coating layer, a mass percentage of the polymer granules is denoted as m %, wherein $m \geq 70$.

14. The separator according to claim 12, wherein the separator satisfies one or more of conditions (A) to (G):

(A) the separator has a machine direction thermal shrinkage rate $\eta_1 \leq 5.0\%$ at 150° C. for 1 h;

(B) the separator has a transverse direction thermal shrinkage rate $\eta_2 \leq 5.0\%$ at 150° C. for 1 h;

(C) the separator has a machine direction tensile strength $R_{m1} \geq 3000$ kg/cm;

(D) the separator has a transverse direction tensile strength $R_{m2} \geq 3000$ kg/cm;

(E) the separator has an air permeability $MAP \leq 250$ s/100 mL;

(F) the separator has a wetted length $L \geq 30$ mm; and (G) the separator has a wetted velocity $u \geq 3$ mm/s.

15. A secondary battery, comprising the separator according to claim 12.

16. An electric apparatus, comprising the secondary battery according to claim 15.

* * * * *